(12) United States Patent
Kanatsu

(10) Patent No.: US 7,170,647 B2
(45) Date of Patent: Jan. 30, 2007

(54) DOCUMENT PROCESSING APPARATUS AND METHOD

(75) Inventor: Tomotoshi Kanatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 931 days.

(21) Appl. No.: 10/013,675

(22) Filed: Dec. 13, 2001

(65) Prior Publication Data

US 2002/0085243 A1  Jul. 4, 2002

(30) Foreign Application Priority Data

Dec. 21, 2000  (JP) ............................. 2000-388887

(51) Int. Cl.
   *H04N 1/387* (2006.01)
(52) U.S. Cl. ................ 358/453; 358/530; 358/438; 382/173; 382/275; 382/199
(58) Field of Classification Search ................ 382/173, 382/275, 199, 272
   See application file for complete search history.

(56) References Cited

U.S. PATENT DOCUMENTS

| | | | | |
|---|---|---|---|---|
| 5,134,666 A | * | 7/1992 | Imao et al. | 382/164 |
| 5,617,485 A | * | 4/1997 | Ohuchi et al. | 382/176 |
| 5,680,478 A | | 10/1997 | Wang et al. | 382/176 |
| 5,768,412 A | * | 6/1998 | Mitsuyama et al. | 382/173 |
| 5,872,864 A | * | 2/1999 | Imade et al. | 382/176 |
| 5,920,655 A | * | 7/1999 | Makita et al. | 382/272 |
| 6,035,059 A | * | 3/2000 | Kurosawa et al. | 382/164 |
| 6,360,006 B1 | * | 3/2002 | Wang | 382/162 |
| 6,473,522 B1 | * | 10/2002 | Lienhart et al. | 382/168 |
| 6,556,711 B2 | * | 4/2003 | Koga et al. | 382/173 |
| 6,888,645 B1 | * | 5/2005 | Fujimoto et al. | 358/1.9 |
| 6,898,329 B1 | * | 5/2005 | Takahashi | 382/272 |
| 6,975,761 B1 | * | 12/2005 | Swann et al. | 382/173 |
| 2002/0021840 A1 | * | 2/2002 | Ohara et al. | 382/199 |
| 2002/0126300 A1 | * | 9/2002 | Abe et al. | 358/1.9 |
| 2002/0164084 A1 | * | 11/2002 | Baggs | 382/275 |

FOREIGN PATENT DOCUMENTS

JP  11-238581  8/1999

* cited by examiner

*Primary Examiner*—Kimberly Williams
*Assistant Examiner*—Ashish K. Thomas
(74) *Attorney, Agent, or Firm*—Fitzpatrick, Cella, Harper & Scinto

(57) ABSTRACT

A document processing apparatus for segmenting a color document image into regions obtains a binary image by binarizing a color image, and extracts regions having different background colors from the color image to generate region information indicating the position and size of each extracted region. By making region segmentation on the basis of the binary image and region information, a region segmentation result that reflects the background colors can be obtained. In this way, region segmentation which can maintain region differences expressed by colors in a color document can be implemented.

7 Claims, 25 Drawing Sheets

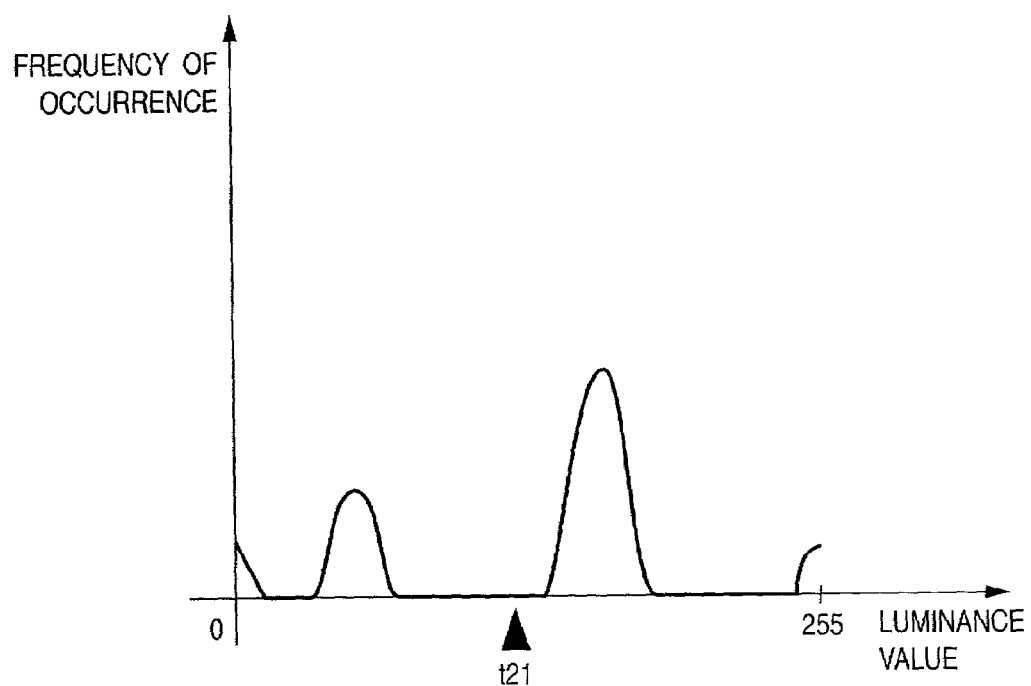

FIG. 11 abcdefg hijklmn
abcdefg hijklmn abcdefg hijklmn abcdefg hijklmn
abcdefg hijklmn

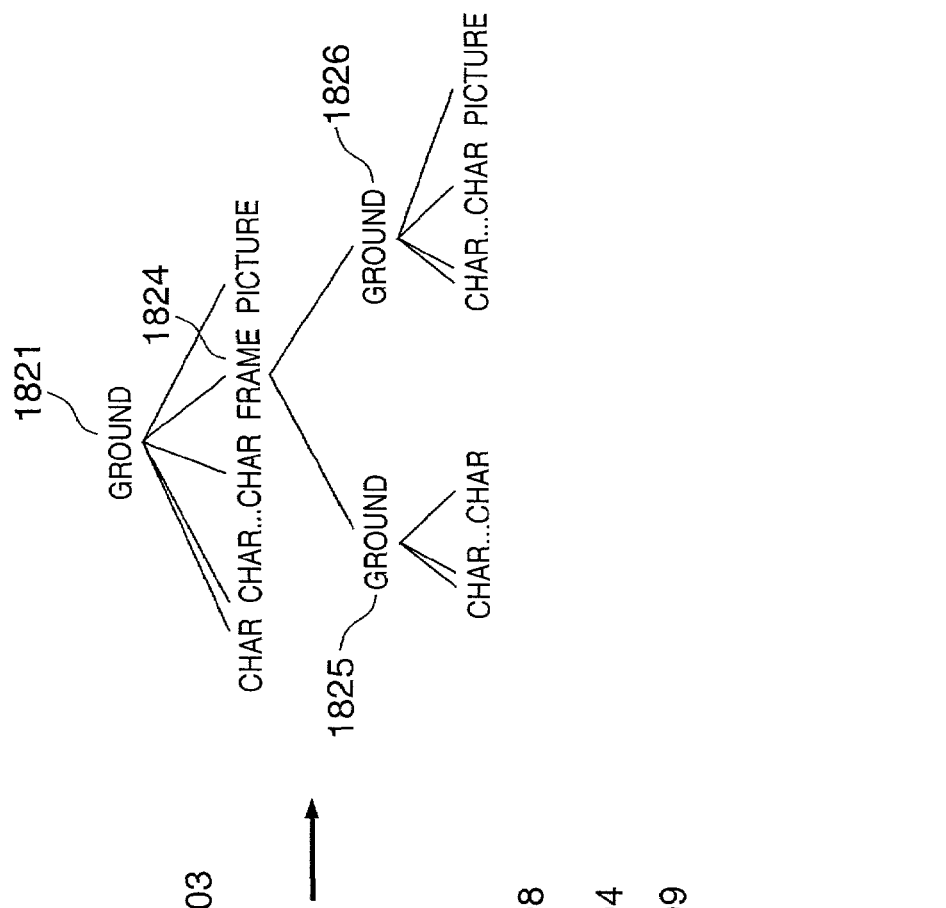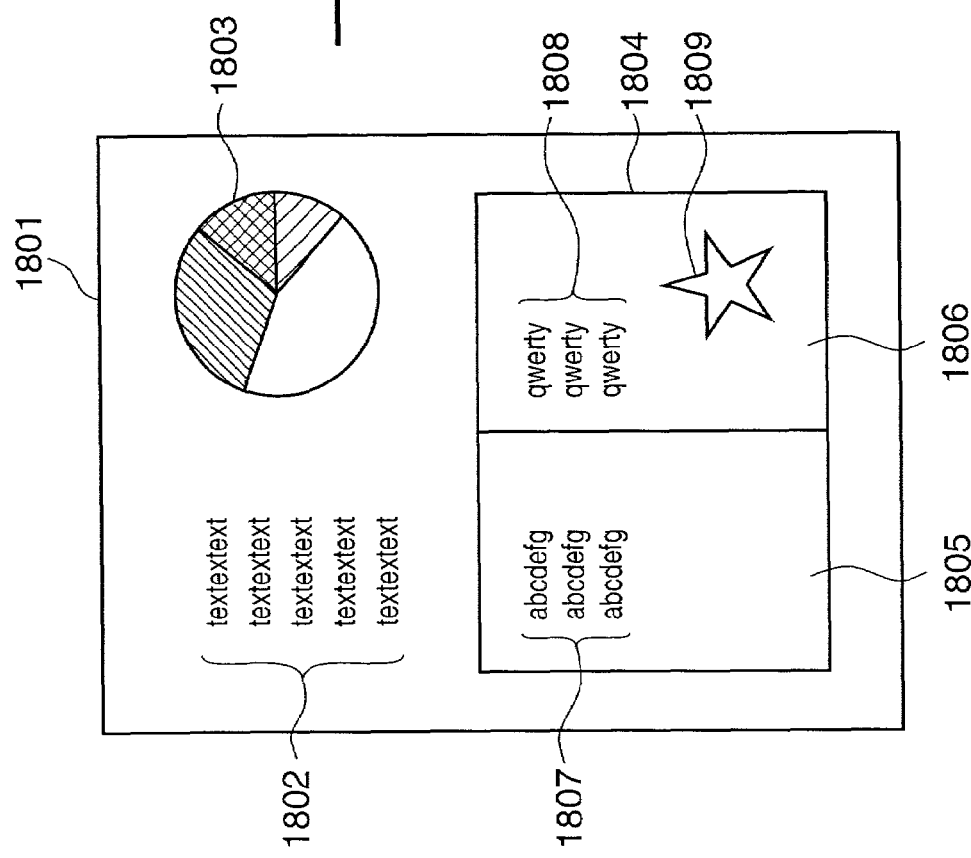

FIG. 25
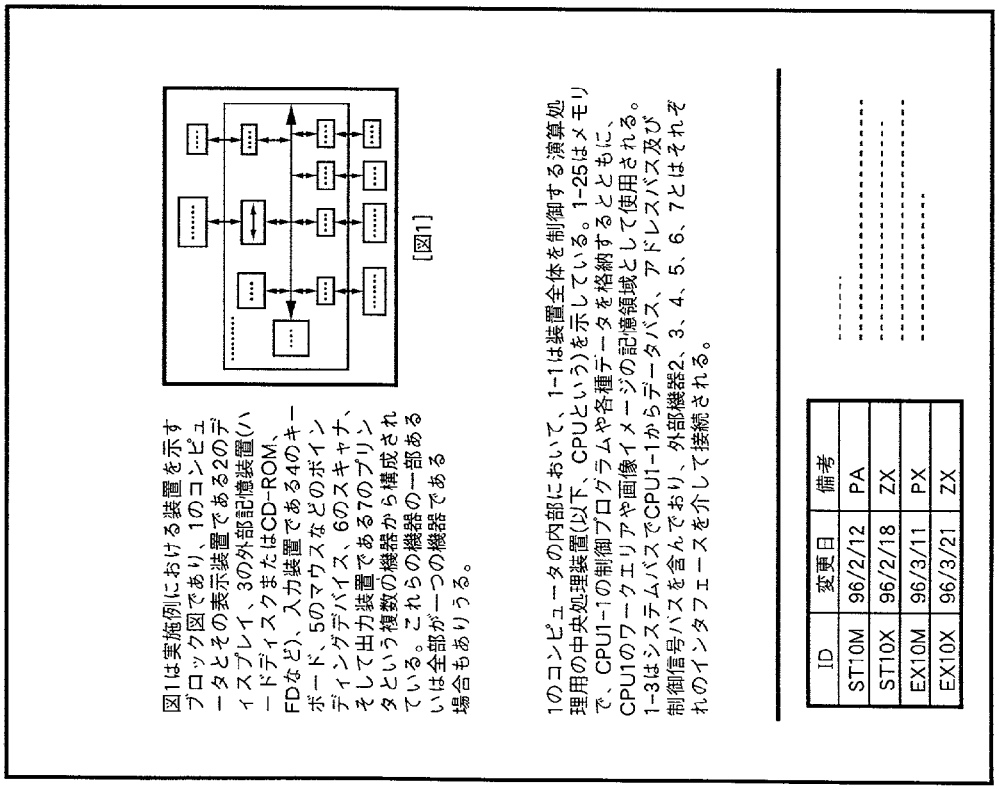
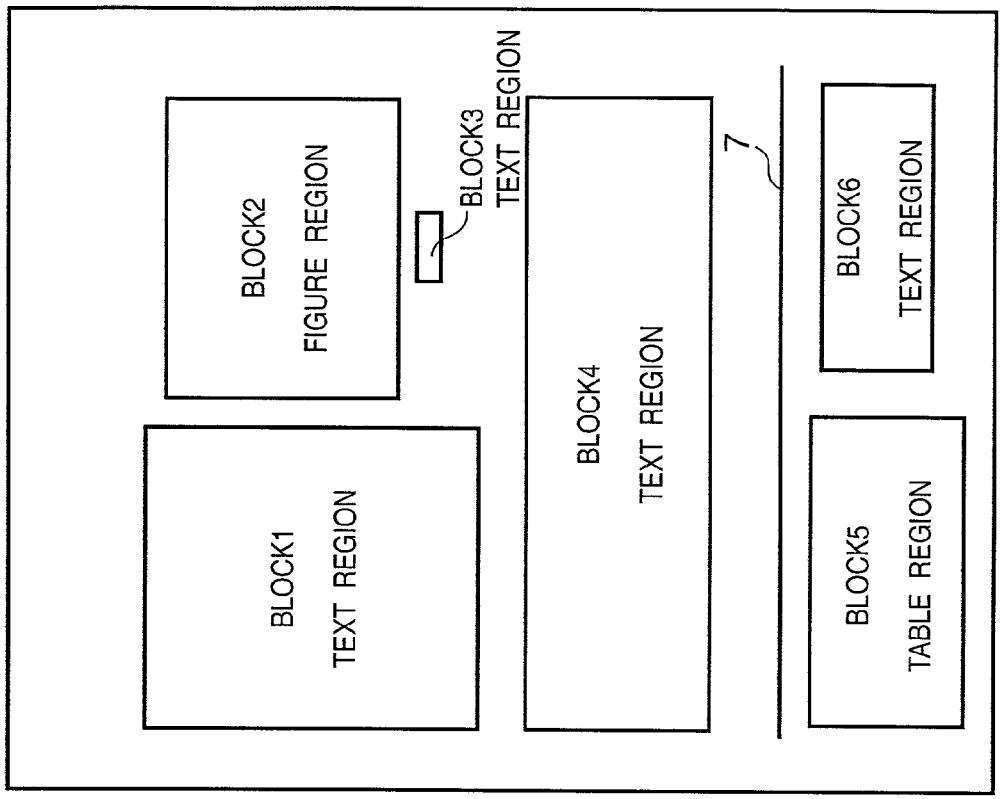

DOCUMENT PROCESSING APPARATUS AND METHOD

FIELD OF THE INVENTION

The present invention relates to an image region separation process for a document image.

BACKGROUND OF THE INVENTION

In recent years, information digitization has advanced, and a demand has arisen for saving or sending digital documents in place of paper documents. Especially, due to the advent of low-price storage media and an increase in communication band, documents to be digitized are changing from monochrome binary documents to full-color documents.

Note that document digitization not only photoelectrically converts a paper document into image data using a scanner or the like, but also segments a document into regions of different natures such as text, symbols, figures, photos, tables, and the like that form the document, and respectively converts text, figure, photo, and table portions into text code information, vector data, image data, and structure data.

A process for analyzing the contents described on a document image for one page, and segmenting the document image into partial elements having different natures such as text, figures, photos, tables, and the like, i.e., a region segmentation process, is done as the first stage of such document digitization process. FIG. 25 shows an example of region segmentation.

As an implementation example of such region segmentation process, U.S. Pat. No. 5,680,478 "Method and Apparatus for character recognition" (Shin-Ywang et. al.,/Canon K.K.) or the like is known. In this example, sets of 8-coupled contour blocks of black pixels and 4-coupled contour blocks of white pixels are extracted from a document image, and characteristic regions in a document such as text regions, pictures or figures, tables, frames, lines, and the like are extracted on the basis of their shapes, sizes, set states, and the like. In the example shown in FIG. 25, characteristic regions of a document such as text regions (blocks 1, 3, 4, and 6), a picture & figure region (block 2), table region (block 5), and a frame/line (7) are extracted.

Note that an 8-coupled contour block of black pixels (to be referred to as a black pixel block hereinafter) is a set of black pixels which are coupled from a given black pixel in one of eight directions, as shown in FIG. 14. Also, a 4-coupled contour block of white pixels (to be referred to as a white pixel block hereinafter) is a set of white pixels which are coupled from a given white pixel in one of four directions, as shown in FIG. 16.

The aforementioned region segmentation process is premised on that the input document image is a monochrome binary image due to its operation principle. Therefore, in order to execute region segmentation of a color document by exploiting this technique, a document image must be converted into a binary image in advance. In general, a color image is converted into a binary image by calculating a threshold value from a pixel luminance distribution, and converting each pixel of the image into a white or black pixel to have this luminance threshold value as a boundary.

The method of calculating a threshold value used to binarize a color image includes a method of calculating a common threshold value to the entire image, and a method of calculating threshold values for respective regions. In a binarization method proposed by Japanese Patent Application No. 11-238581 of the present applicant, an optimal threshold value is dynamically calculated for each region in accordance with the contents of an input document, and is used to attain optimal binarization for each region. Especially, this method can implement binarization which can automatically convert all characters on a color document that includes both high-luminance characters on a low-luminance background and low-luminance characters on a high-luminance background into black characters on a white background, and an optimal binary image as an input of the region segmentation process can be obtained.

FIG. 24 shows a region segmentation process of a document which includes a colored background by the previously proposed binarization method. Referring to FIG. 24, a color document 2301 includes a dark-colored background region on its lower half portion, on which light-color characters are printed, and dark-color characters are printed on a light-color background of the remaining portion. As can be seen from FIG. 24, the upper and lower half portions of such document have separate meanings.

When a color document like the document 2301 undergoes binarization by the aforementioned binarization method, a binary image 2302 in FIG. 24 is generated. In the binary image 2302, the background color is removed and is expressed by white pixels, and all characters are expressed by black pixels. At this time, when the binary image 2302 undergoes the conventional region segmentation process, a result 2303 shown in FIG. 24 is obtained. In this case, since information of the region with the color background, which is present on the lower half of the image is omitted, TEXT1 and TEXT2 are coupled although they should be respectively separated into two regions at their center.

That is, range designation information of the text region using background color that the color image originally has is lost upon binarization.

SUMMARY OF THE INVENTION

The present invention has been made in consideration of the above problems, and has as its object to attain region segmentation which can maintain region differences expressed by colors.

In order to achieve the above object, a document processing apparatus according to the present invention comprises the following arrangement.

That is, a document processing apparatus comprises:

generation means for extracting a region having a different background color from a color image, and generating region information indicating a position and size of the region;

binarization means for binarizing the color image to obtain binary image data; and segmentation processing means for performing region segmentation on the basis of the binary image data obtained by the binarization means and the region information generated by the generation means.

In order to achieve the above object, a document processing method according to the present invention comprises the following steps.

That is, a document processing method comprises:

the generation step of extracting a region having a different background color from a color image, and generating region information indicating a position and size of the region;

the binarization step of binarizing the color image to obtain binary image data; and the segmentation processing step of performing region segmentation on the basis of the binary image data obtained in the binarization step and the region information generated in the generation step.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principles of the invention.

FIG. 8 shows a histogram of luminance values in a region 703 in FIG. 7;

FIG. 11 shows a final binary image of the color image shown in FIG. 5;

FIG. 18A shows an example of a document image;

FIG. 18B shows an example of the tree structure obtained by the element extraction & tree structure forming process of the document image shown in FIG. 18A in step S1201;

FIG. 25 shows an example of region segmentation.

DETAILED DESCRIPTION OF THE PREFERRED EMBODIMENTS

Preferred embodiments of the present invention will now be described in detail in accordance with the accompanying drawings.

Figure 1:
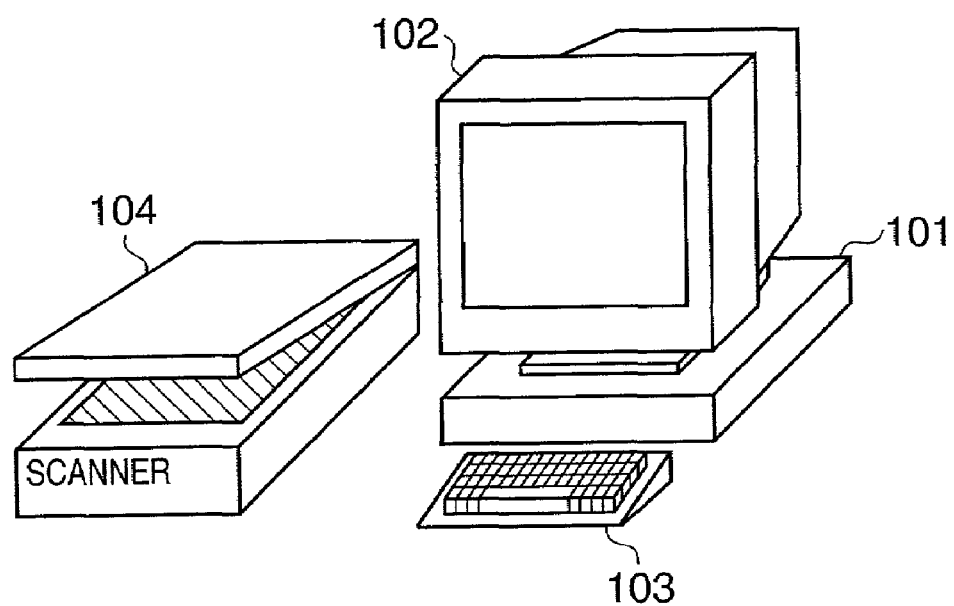
FIG. 1 is a schematic view showing the outer appearance of a document processing apparatus according to an embodiment of the present invention.

FIG. 1 shows the outer appearance of a document processing apparatus according to an embodiment of the present invention. Referring to FIG. 1, reference numeral 101 denotes a computer which executes document digitization processing programs including programs for implementing processes to be described later with reference to the accompanying flow charts. The computer 101 comprises a display 102 for displaying the states and images for the user, and an input device 103 which includes a keyboard and a pointing device such as a mouse or the like, which accept user's operations. As the display 102, a CRT, LCD, or the like is used. Reference numeral 104 denotes a scanner for optically reading a document image, digitizing the image, and sending the obtained image data to the computer 101. In this embodiment, a color scanner is used.

Figure 2:
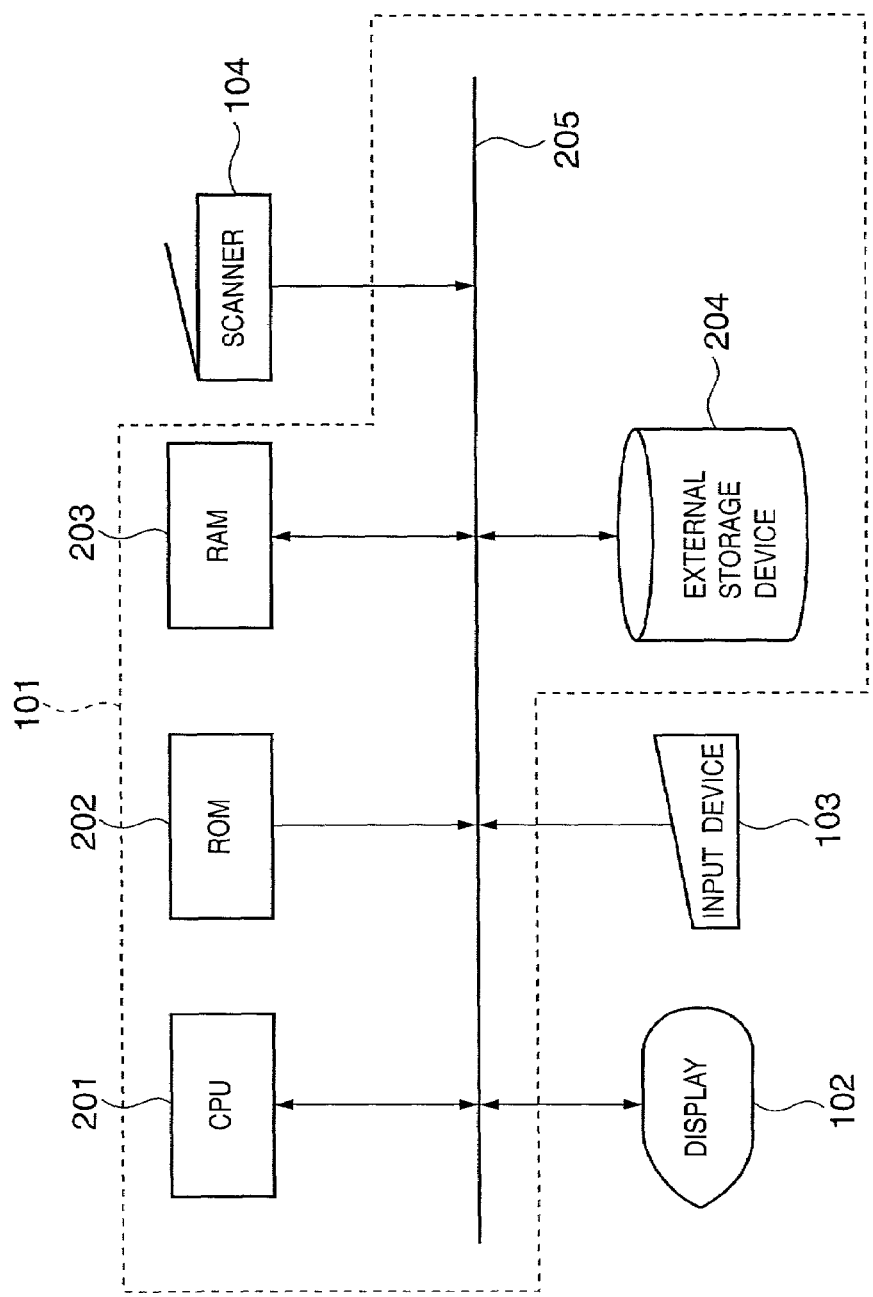
FIG. 2 is a block diagram showing the arrangement of the document processing apparatus according to the embodiment of the present invention.

FIG. 2 is a block diagram showing the arrangement of the document processing apparatus of this embodiment. Referring to FIG. 2, reference numeral 201 denotes a CPU for implementing various functions including a digitization process (to be described later) by executing control programs stored in a ROM 202 or RAM 203. Reference numeral 202 denotes a ROM for storing various control programs to be executed by the CPU 201, and data. Reference numeral 203 denotes a RAM which stores various control programs to be executed by the CPU 201, and provides a work region required for the CPU 201 to execute various processes. Reference numeral 204 denotes an external storage device, which stores control programs that make the CPU 201 implement processes to be described later with reference to the accompanying flow charts, document image data obtained by reading a document using the scanner 104, and the like. Reference numeral 205 denotes a computer bus which connects the aforementioned building components.

Figure 3:
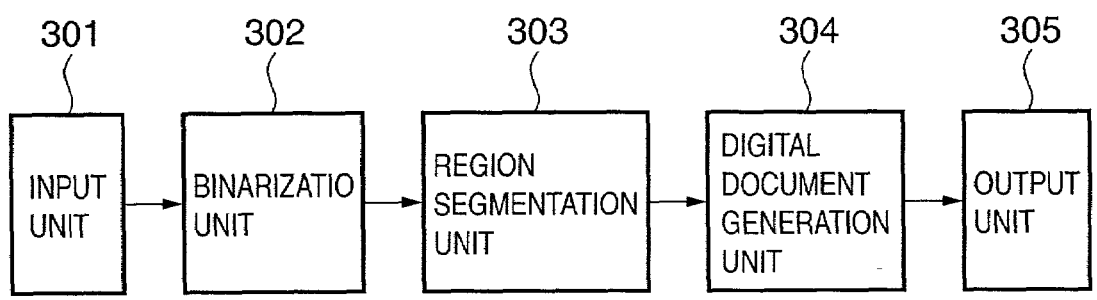
FIG. 3 is a diagram showing an outline of a document digitization process by the document processing apparatus according to the embodiment of the present invention.

FIG. 3 shows an outline of the document digitization process by the document processing apparatus of this embodiment. In the flow of the digitization process of this embodiment, an input unit 301 reads a color document to be digitized using the scanner 104, and stores the document in the external storage device 204 as image data. A binarization unit 302 binarizes the document image data stored in the external storage device 204 to prepare for a region segmentation process to be done at a later time. A region segmentation unit 303 extracts elements such as text, figures, tables, frames, lines, and the like from the binary image obtained by the binarization unit 302 to segment the image into regions.

A digital document generation unit 304 generates a digital document using character recognition data and tree structure data on the basis of attributes of segmented elements. An output unit 305 stores the generated digital document in the external storage device 204. Note that the output form of the output unit 305 is not limited to storage in the external storage device 204. For example, the output from the output unit 305 may be displayed on the display 102, may be output to another apparatus on a network via a network interface (not shown), or may be output to a printer (not shown).

Figure 4:
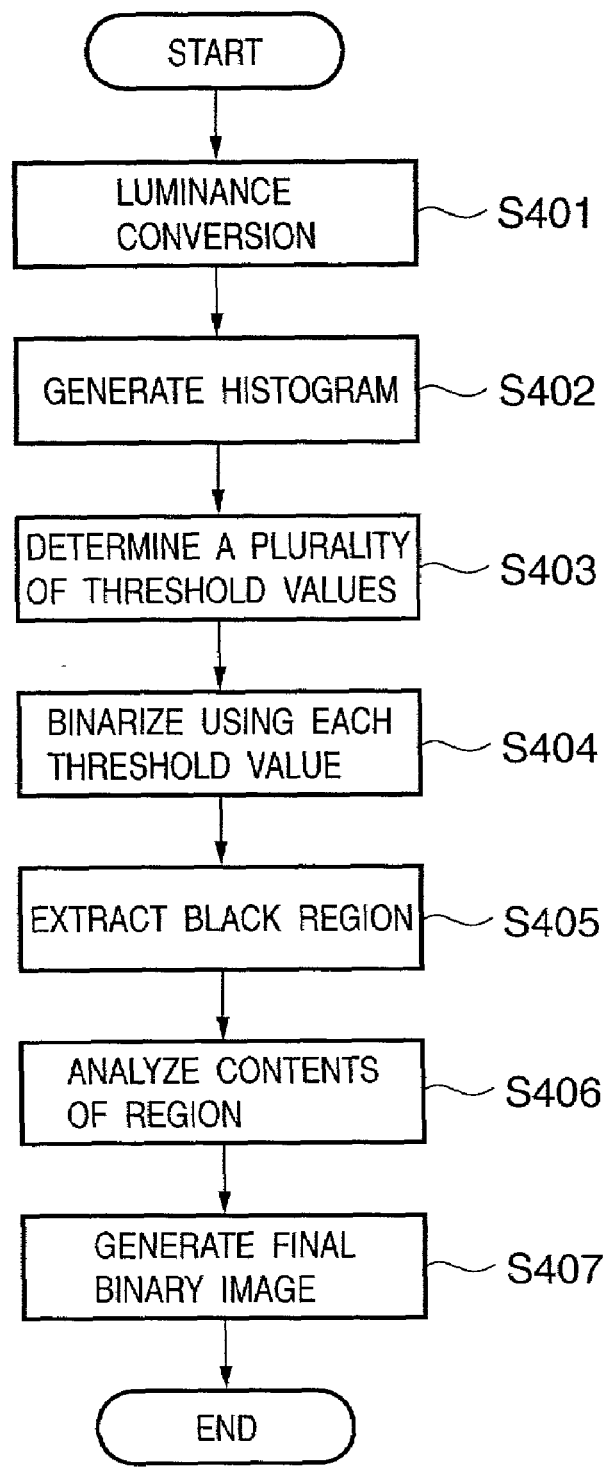
FIG. 4 is a flow chart for explaining a binarization process according to the embodiment of the present invention.
Figure 5:
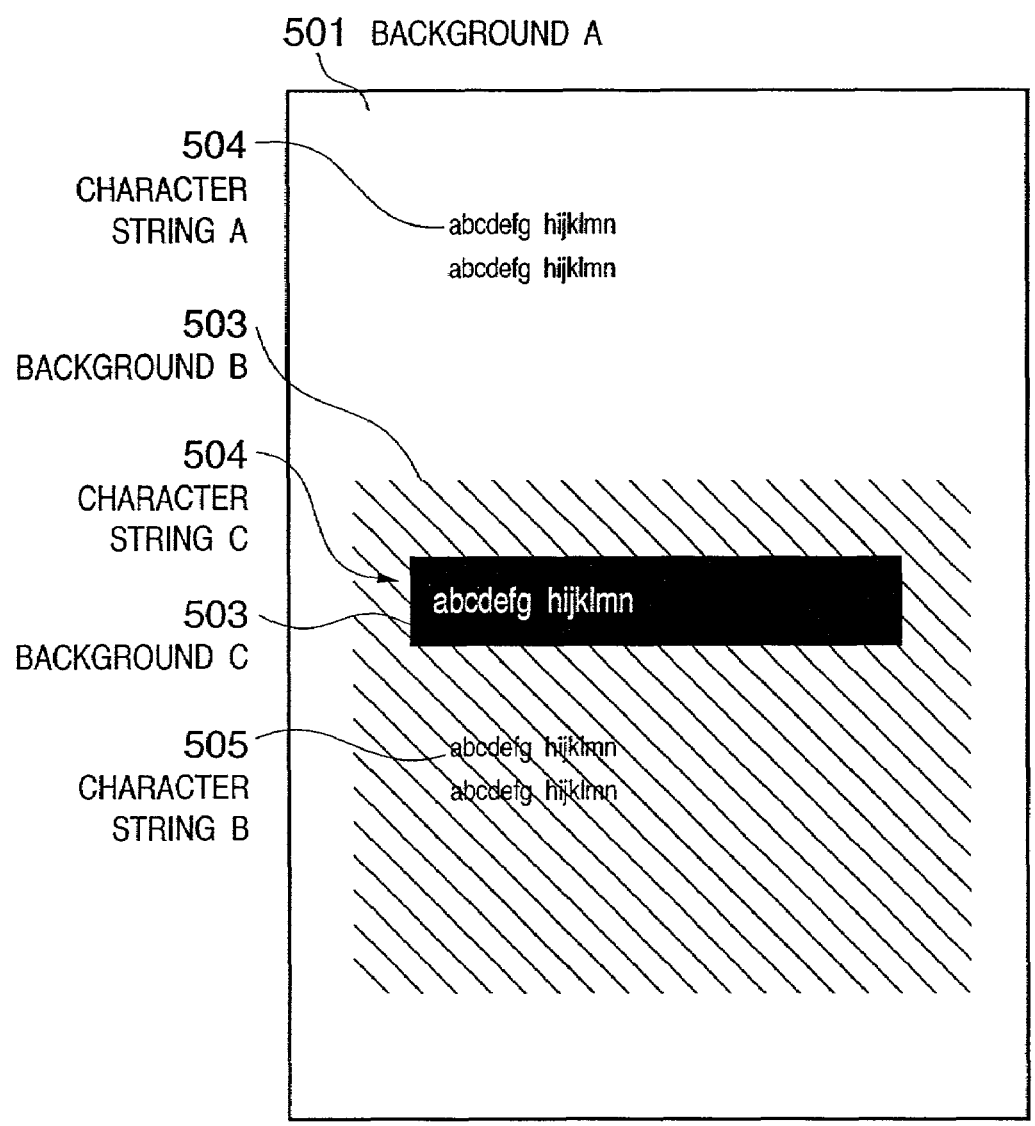
FIG. 5 shows an example of a color document image used in the description of the embodiment of the present invention.

The operation of the binarization unit 302 shown in FIG. 3 will be described below with reference to the accompanying drawings. FIG. 4 is a flow chart for explaining the binarization process according to this embodiment. FIG. 5 shows an example of a color document image used in the description of this embodiment. Assume that a color document image shown in FIG. 5 includes three background colors (backgrounds A 501, B 502, and C 503), which are respectively white, yellow, and blue. On the other hand, the text colors of character strings A 504 and B 505 are black, and that of a character string C 506 is white.

In step S401, a color document image to be processed is converted into a luminance image. Note that the color format of the source image is an RGB format, the luminance image has a grayscale format that assumes a value of 0 to 255 per pixel, and luminance data Y of each pixel is given by Y=0.299R+0.587G+0.114B using pixel values R, G, and B of the source image. Of course, other formats/conversion formulas may be used. With this process, luminance data of the background colors A 501, B 502, and C 503 in FIG. 5 are respectively converted into 255, 200, and 40, thus obtaining a histogram of luminance values (to be described later with reference to FIG. 6). Note that the luminance values of even identical background colors vary depending on positions due to a sheet surface state and variations in photoelectric conversion in practice. Hence, peaks of the histogram curve shown in FIG. 6 have given ranges.

Figure 6:
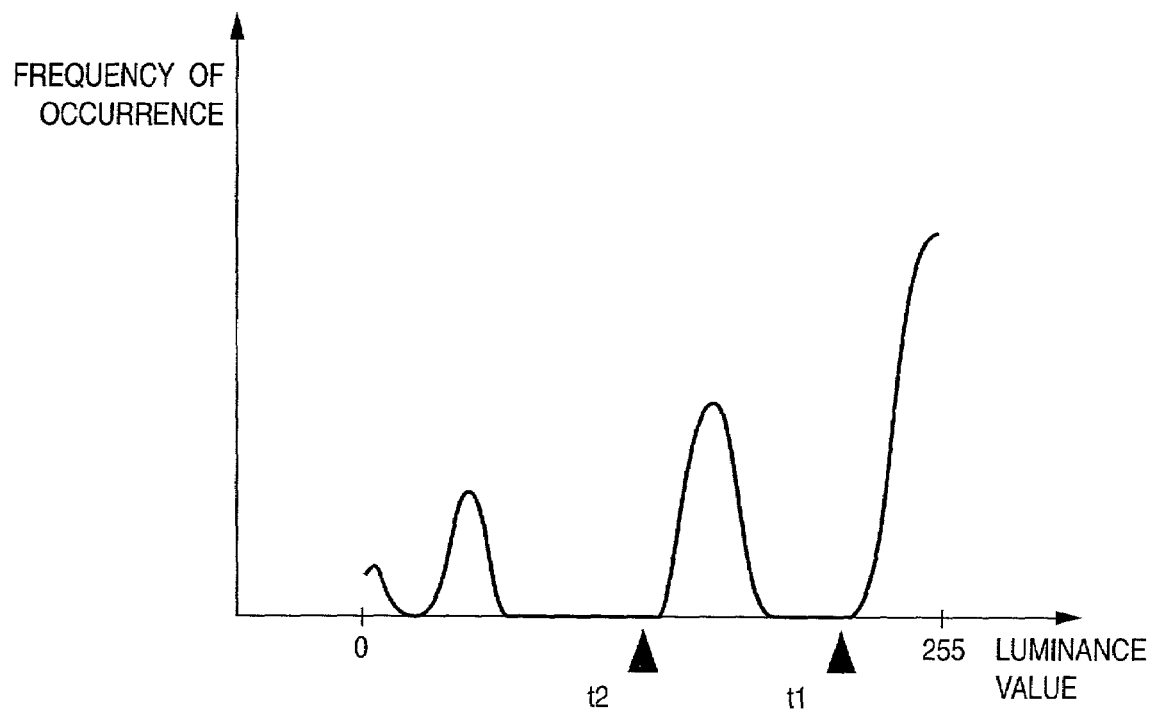
FIG. 6 shows a histogram of luminance values obtained from the color image shown in FIG. 5.

In step S402, a histogram of the luminance image data obtained in step S401 is calculated. FIG. 6 shows the histogram of the luminance values obtained from the color image shown in FIG. 5. After the histogram is obtained, a plurality of threshold values are determined from that histogram in step S403. For example, in this embodiment, two threshold values t1 and t2 are extracted from the histogram shown in FIG. 6.

These threshold values t1 and t2 can be determined in, e.g., the following procedure. Threshold values are selected using the following conditions with reference to luminance values 255 (white) to 0 (black) of the histogram. The threshold value select conditions are set as follows.

Condition 1: In the histogram curve, the total frequency of occurrence (area) between the current reference point and a point of a luminance value which has, for example, 10 values larger than that reference point along the abscissa (between current luminance value n and luminance value n+10) is larger than a predetermined first value.

Condition 2: An abrupt decrease in frequency of occurrence along the ordinate of the histogram curve is generated (for example, a change "larger than a predetermined first slope" is generated once, or a change "larger than a predetermined second slope" is successively generated twice).

Condition 3: A moderate decrease or increase of the histogram curve is generated (smaller than a predetermined third slope).

In this embodiment, points t1 and t2 shown in FIG. 6 are detected since "condition 1", "condition 2", and "condition 3" are satisfied in turn. Note that the reference points may refer to the histogram curve at given intervals. This embodiment uses the aforementioned conditions. However, the threshold value determination method is not limited to such specific method. For example, a point that simultaneously satisfies following conditions 4 to 6 may be selected as a threshold value.

Condition 4: The total frequency of occurrence (area) between the current reference point and a point of a luminance value which has, for example, 40 values larger than that reference point along the abscissa (between current luminance value n and luminance value n+40) is larger than a predetermined second value.

Condition 5: The frequency of occurrence on the ordinate at the current reference point on the histogram curve is smaller than a predetermined third value.

Condition 6: Histogram values at the current reference point and a point of a luminance value which has, for example, 20 values larger than that reference point in the histogram curve are larger than a predetermined fourth value (histgram values at current luminance value n and luminance value n+20).

Figure 7A:
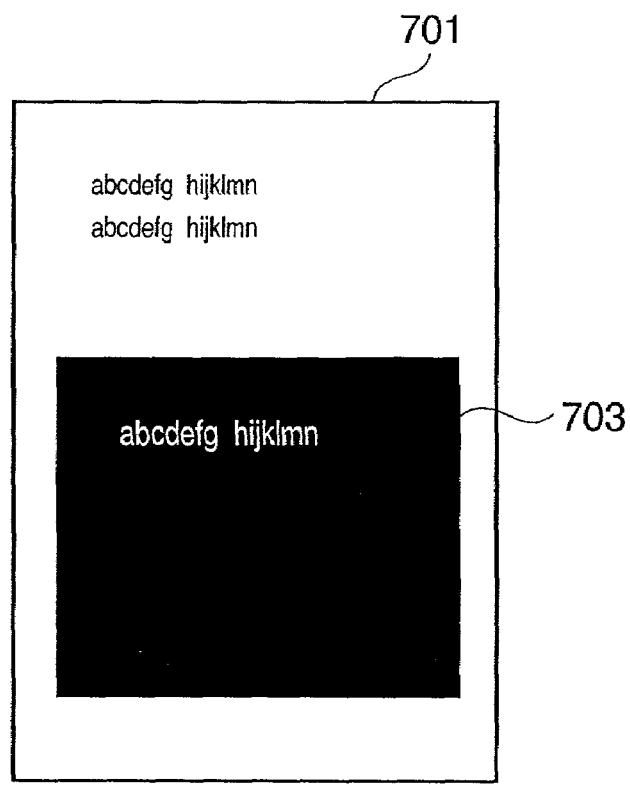
FIG. 7A shows an image obtained by binarizing the color image shown in FIG. 5 using a threshold value t1 shown in FIG. 6.
Figure 7B:
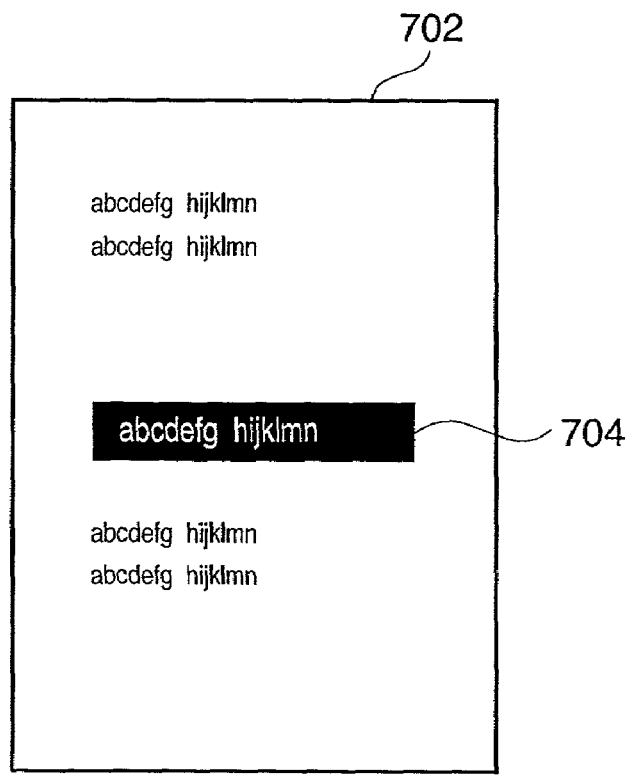
FIG. 7B shows an image obtained by binarizing the color image shown in FIG. 5 using a threshold value t2 shown in FIG. 6.

In step S404, a plurality of binary images are generated using the threshold values. These images are temporary binary images. In this example, binary images 701 and 702 shown in FIGS. 7A and 7B are respectively generated by binarizing the document image using the threshold values t1 and t2. Note that regions 703 and 704 respectively correspond to those of the backgrounds B 502 and C 503 shown in FIG. 5. Using the threshold value t1, both the backgrounds B 502 and C 503 are converted into black regions. Using the threshold value t2, the backgrounds B 502 and C 503 are respectively converted into white and black regions.

In step S405, black regions are extracted from the binary images obtained in step S404, and are recorded as region information indicating regions having different background colors. In this process, coupled components of black pixels on the binary image are traced to extract a rectangular region having a given size or more. In the examples shown in FIGS. 7A and 7B, the regions 703 and 704 are respectively extracted from the binary images 701 and 702.

In step S406, the regions extracted in step S405 are analyzed. In this process, the ranges of the regions extracted in step S405 are extracted from the luminance image obtained in step S401, and histograms of luminance values are calculated for the respective ranges. It is checked based on each histogram if the luminance values of the corresponding region must be inverted. If such process is required, the luminance values are inverted. Furthermore, an optimal binarization threshold value to each region is calculated from the histogram in the same manner as in FIG. 6 (since the objective region size becomes small, a different predetermined value (threshold value) is used in checking). The obtained binary threshold values and inversion information are output while being appended to each region information. Whether or not inversion is required can be determined by calculating the average value (average) and skew (skew) of the histogram by:

$$(\text{average}) = \Sigma i p(i),$$

$$\sigma^2 = \Sigma (i-av)^2 p(i),$$

$$(\text{skew}) = 1/\sigma^2 \Sigma (i-av)^3 p(i),$$

where $\sigma ip(i)$ is the sum total of $ip(i)$ which ranges from i=0 to i=255, p(i) is the probability density, and av is the average value.

When the absolute value of the skew is larger than a predetermined threshold value, it is determined that the region contains text. When it is determined that the region contains text and the skew is positive, it is determined that an image of that region is to be inverted, and an inversion flag=yes is set.

Figure 9:
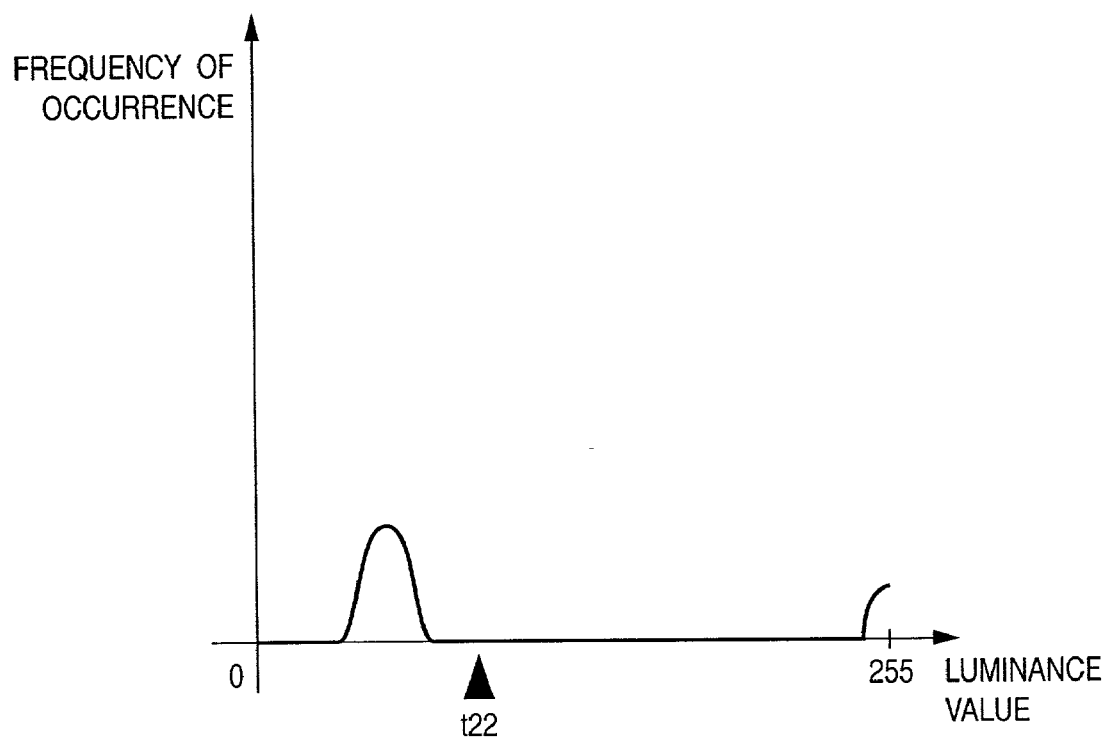
FIG. 9 shows a histogram of luminance values in a region 704 in FIG. 7.
Figure 10:
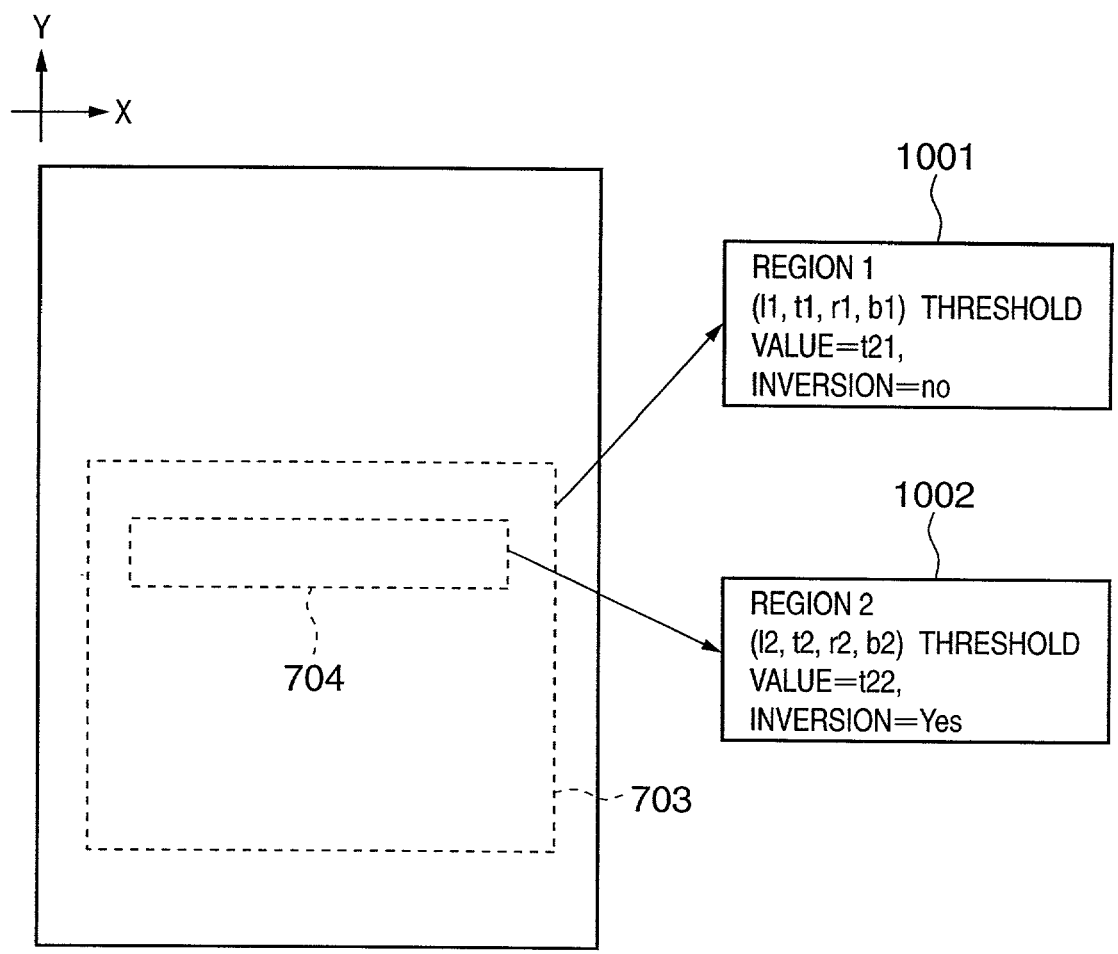
FIG. 10 shows region information.

In this example, a histogram shown in FIG. 8 is calculated from the region 703, it is determined that inversion is not necessary, and a threshold value t21 is calculated from that histogram. Furthermore, a histogram shown in FIG. 9 is calculated from the region 704, it is determined that inversion is necessary, and a threshold value t22 is calculated from that histogram (note that FIG. 9 shows the histogram before inversion, and the threshold value t22 is that for the histogram before inversion). Whether or not inversion is necessary can be determined by checking, e.g., if the area of a region having a low luminance value is larger than that of a region having a high luminance value in the histogram. When the region with a low luminance value is broader, since the luminance value of a background is low, it is determined that the inversion process is necessary. As shown in FIG. 10, a set of coordinate values, binary threshold value, and inversion information is stored for each region.

In this example, region information 1001 for the region 703 has an x-coordinate value l1 of the left end of a rectangle, an x-coordinate value r1 of the right end, a y-coordinate value t1 of the top end, and a y-coordinate value b1 of the bottom end as coordinate values, the threshold value t21 calculated from the histogram in FIG. 8 as a binary threshold value, and inversion=no as inversion information. Likewise, region information 1002 for the region 704 has an x-coordinate value l2 of the left end of a rectangle, an x-coordinate value r2 of the right end, a y-coordinate value t2 of the top end, and a y-coordinate value b2 of the bottom end as coordinate values, the threshold value t22 calculated from the histogram in FIG. 9 as a binary threshold value, and inversion=yes as inversion information.

In step S407, a final binary image is generated from the luminance image obtained in step S401 on the basis of the region information obtained in step S406. According to this example, the following processes are done.

(1) The entire image is binarized using the threshold value t1 to obtain the binary image 701.

(2) A luminance image corresponding to the region 703 on the binary image 701 is processed (binarized using a threshold value (t21) in this case) according to the contents of the region information 1001, and the obtained image is overwritten on the region 703. As a result, the binary image 702 is obtained.

(3) As for the region 704, since the corresponding region information 1002 contains inversion=yes, the luminance image corresponding to the region 704 undergoes an inversion process, and an image obtained by binarizing the region 704 using the threshold value t22 is overwritten on the region 704. As a result, a final binary image shown in FIG. 11 is obtained from the color image shown in FIG. 5.

In this manner, the region segmentation unit 303 executes region segmentation using the binary images and region information obtained by the binarization unit 302. The process of the region segmentation unit 303 will be described below.

Figure 12:
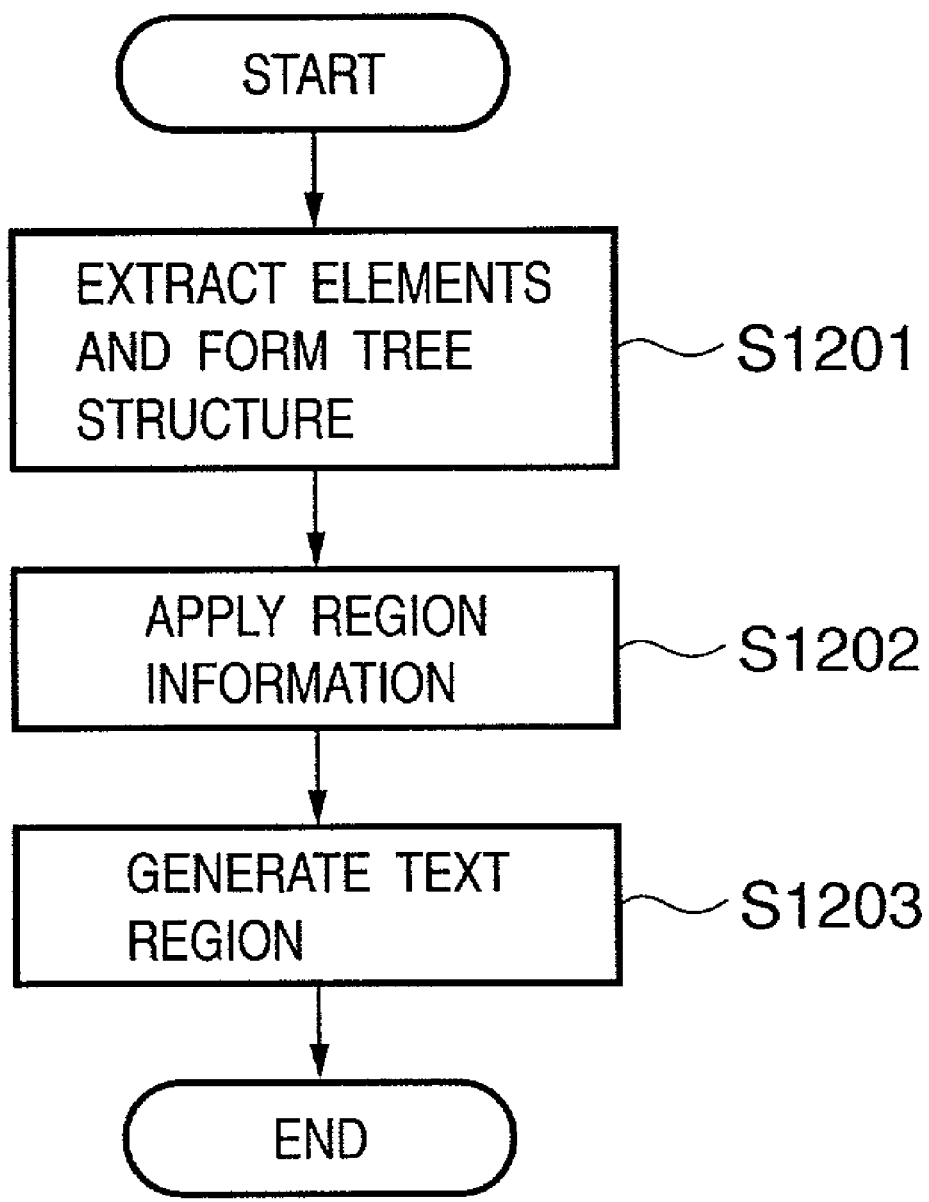
FIG. 12 is a flow chart for explaining a region segmentation process according to the embodiment of the present invention.
Figure 13:
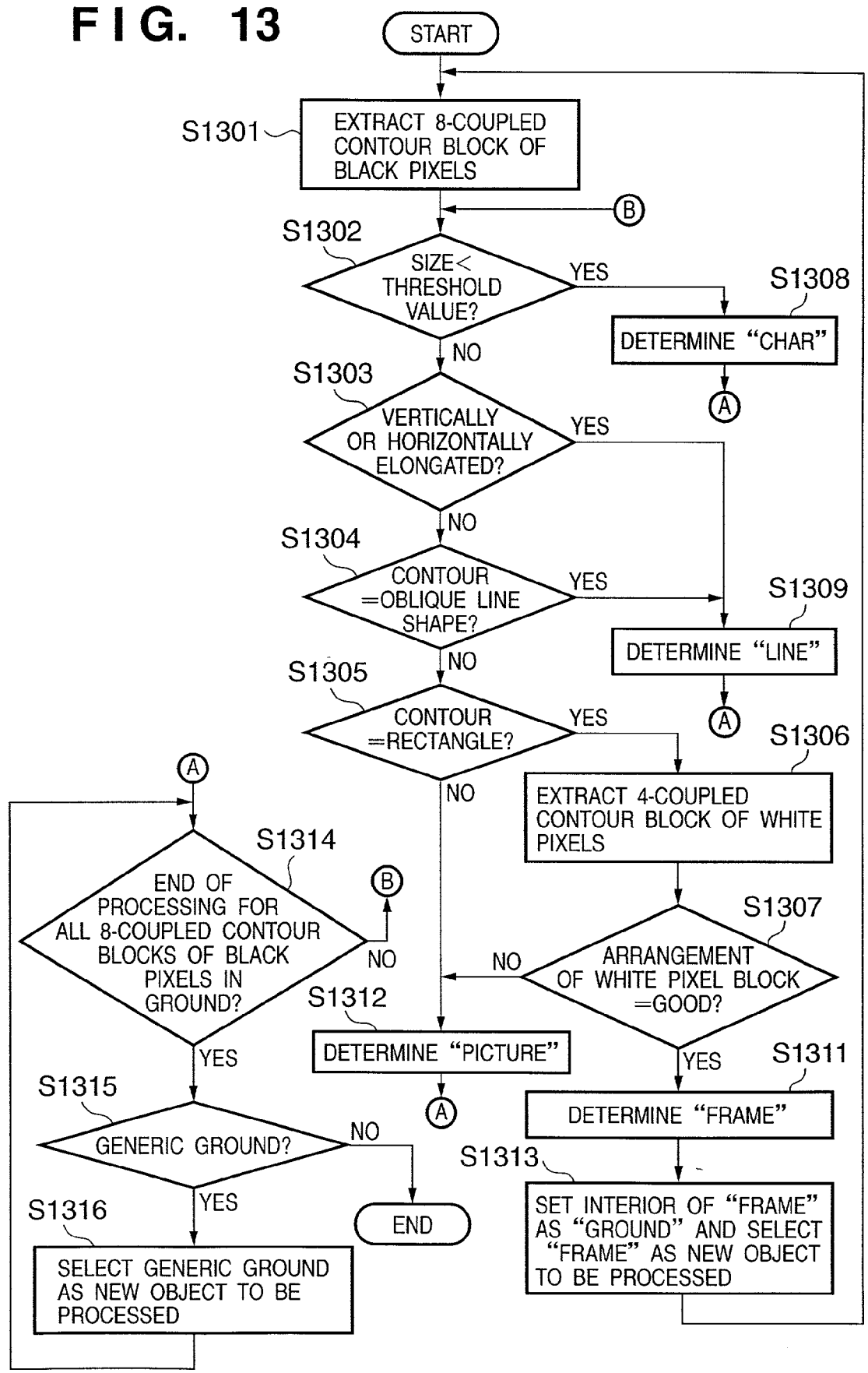
FIG. 13 is a flow chart for explaining the element extraction & tree structure forming process in step S1201 in FIG. 12.

FIG. 12 is a flow chart for explaining the region segmentation process of this embodiment. The region segmentation unit 303 extracts document elements from the document image binarized by the binarization unit 302 to form their tree structure expressions in step S1201. Details of the process in step S1201 will be described below using the flow chart in FIG. 13. FIG. 13 is a flow chart for explaining the element extraction & tree structure forming process in step S1201 in FIG. 12.

Figure 14:
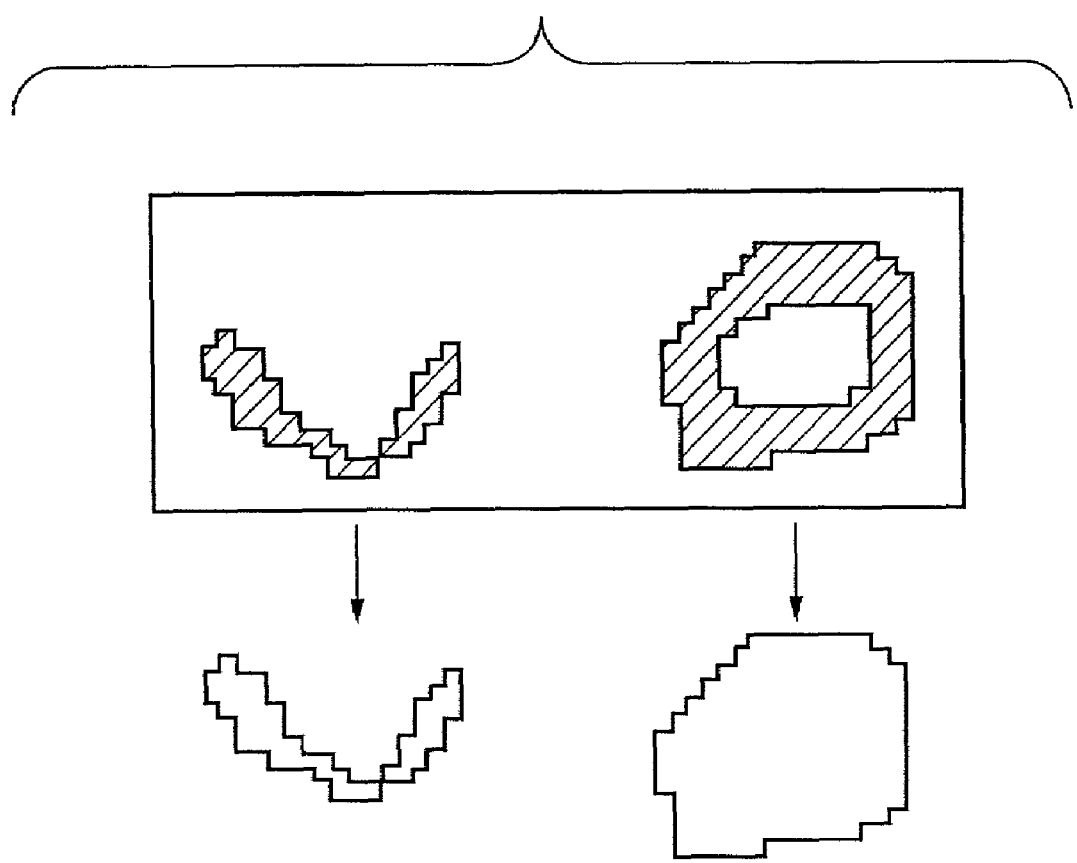
FIG. 14 shows an example of 8-coupled contour blocks of black pixels.

In step S1301, all black pixel blocks are extracted from the binary image. Note that the black pixel blocks are 8-coupled contour blocks of black pixels, and are sets of black pixels having contours formed by pixels which contact vertically, horizontally, and obliquely, as shown in FIG. 14. It is checked in step S1302 if each extracted black pixel block has a size equal to or smaller than a threshold value set in advance for the expected maximum character height and width (values obtained in advance by experiments). If the size is equal to or smaller than the threshold value, the flow advances to step S1308, and it is determined that the black pixel block is a character element. The character element will be expressed by "CHAR" hereinafter.

It is checked in step S1303 if the extracted pixel block is elongated vertically or horizontally at a given ratio or more. If the extracted pixel block is elongated vertically or horizontally at a given ratio or more, it is determined in step S1309 that the block is "LINE". It is checked in step S1304 if a contour formed by black pixels in the extracted black pixel block has a thin, oblique, linear shape. If the contour has a thin, oblique, linear shape, the flow advances to step S1309 to determine that the black pixel block of interest is "LINE".

Figure 15B:
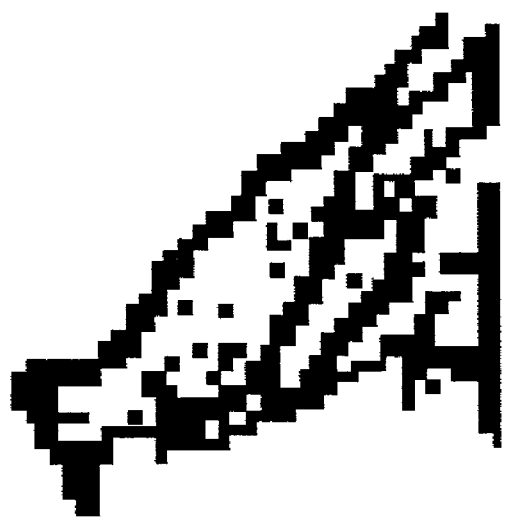
FIG. 15B shows an example when the contour of a black pixel block forms a non-rectangle.
Figure 15A:
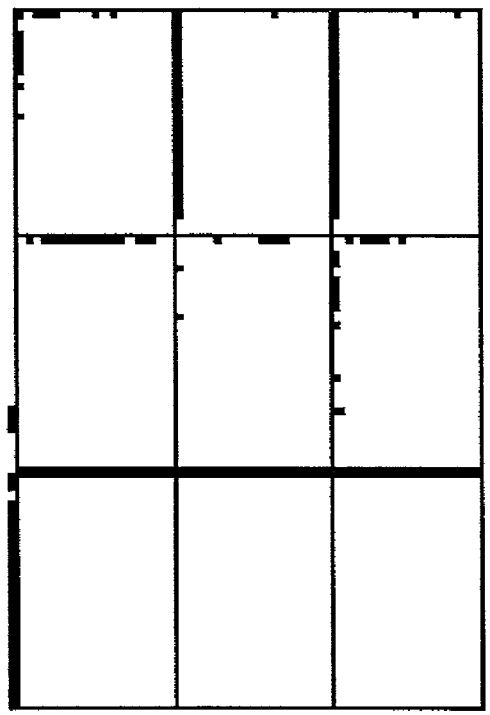
FIG. 15A shows an example when the contour of a black pixel block forms a rectangle.
Figure 16:
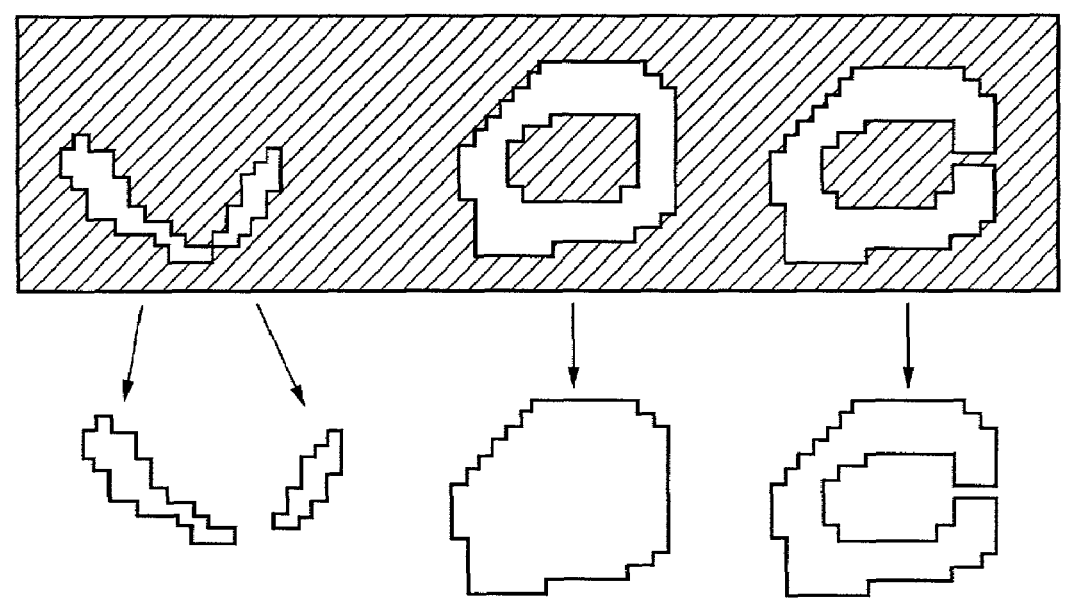
FIG. 16 shows an example of 4-coupled contour blocks of white pixels.

It is checked in step S1305 if the black pixel block has a rectangular contour shape. FIG. 15A shows an example when the contour of a black pixel block forms a rectangle, and FIG. 15B shows an example when the contour of a black pixel block forms a non-rectangle. If it is determined in step S1305 that the black pixel block has a non-rectangular contour shape, the flow advances to step S1312 to determine that the black pixel block is "PICTURE".

If the black pixel block has a rectangular contour shape, the flow advances to step S1306. In step S1306, 4-coupled contour blocks of white pixels present in the black pixel block are extracted. Note that the 4-coupled contour blocks of white pixels are sets of white pixels having contours formed by pixels that contact each other only horizontally and vertically. Such sets will be referred to as white pixel blocks hereinafter.

Figure 17A:
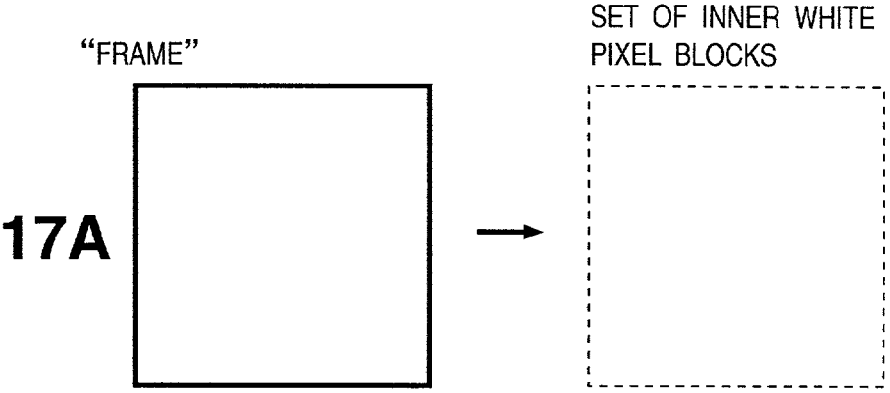
FIGS. 17A to 17C show arrangement examples of inner white pixel blocks in frames (FRAME) and figure (PICTURE)
Figure 17B:
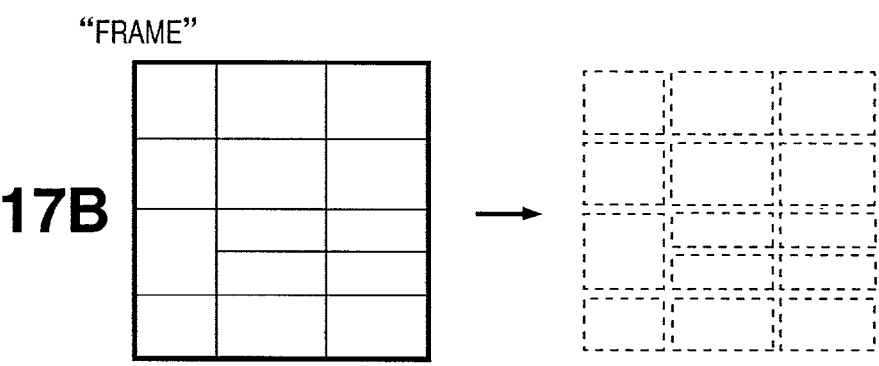
Figure 17C:
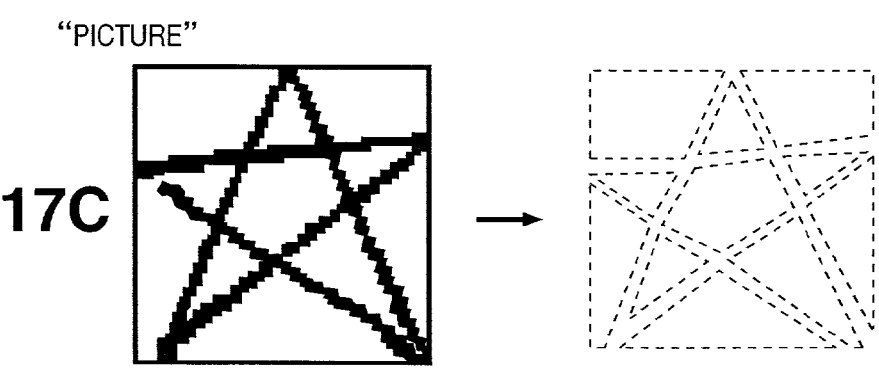

It is checked in step S1307 if all white pixel blocks extracted from the black pixel block in step S1306 have a rectangular shape, and fill the black pixel block at given intervals without any gap. If YES in step S1307, the flow advances to step S1311 to determine that the block pixel block is "FRAME". FIGS. 17A to 17C show arrangement examples of inner white pixel blocks in frames (FRAME) and figure (PICTURE). Since the blocks shown in FIGS. 17A and 17B satisfy the condition in step S1307, a frame (FRAME) is determined in step S1311.

Since the arrangement of white pixel blocks shown in FIG. 17C does not satisfy the condition "all white pixel blocks extracted from the black pixel block have a rectangular shape, and fill the black pixel block without any gap", a figure (PICTURE) is determined in step S1312. As a result, the black pixel block which does not satisfy any conditions until step S1307 is determined to be "PICTURE" in step S1312.

In this embodiment, an element "GROUND" as a parent of respective elements is used. If the entire image is expressed by one "GROUND", all elements extracted from the image are expressed as child elements of "GROUND". Each of the white pixel blocks extracted from the black pixel block, which is determined to be "FRAME" is defined as "GROUND", and undergoes processes in steps S1301 to S1312 to extract child elements (step S1313). If another "FRAME" is extracted from "FRAME", the extracted "FRAME" is defined as GROUND, and processes are executed recursively.

If the processes for all the 8-coupled contour blocks of black pixels in given "GROUND" are complete, it is checked if generic "GROUND" is present (steps S1314 and S1315). If generic "GROUND" is present, the flow advances to step S1316 to select that generic "GROUND" as an object to be processed. If "GROUND" selected as the object to be processed in step S1316 includes 8-coupled contour blocks of black pixels to be processed, the flow returns to step S1302 to analyze them.

Upon completion of all recursive internal searches, elements extracted from the image form a tree structure. FIG. 18A shows an example of a document image, and FIG. 18B shows an example of the tree structure obtained by the element extraction & tree structure forming process in step S1201. As shown in FIG. 18A, a document image 1801 has text strings (CHAR) 1802, 1807, and 1808, a frame (FRAME) 1804, and figures (PICTURE) 1803 and 1809.

This document image 1801 is converted into a tree structure by the aforementioned process, as shown in FIG. 18B. GROUND 1821 indicates the entire document image 1801, and FRAME 1824 as one of elements of GROUND 1821 corresponds to the frame 1804 in the document image 1801. Furthermore, the frame 1804 is divided into two frames 1805 and 1806, which are respectively indicated by GROUND 1825 and GROUND 1826 on the tree structure.

Figure 19:
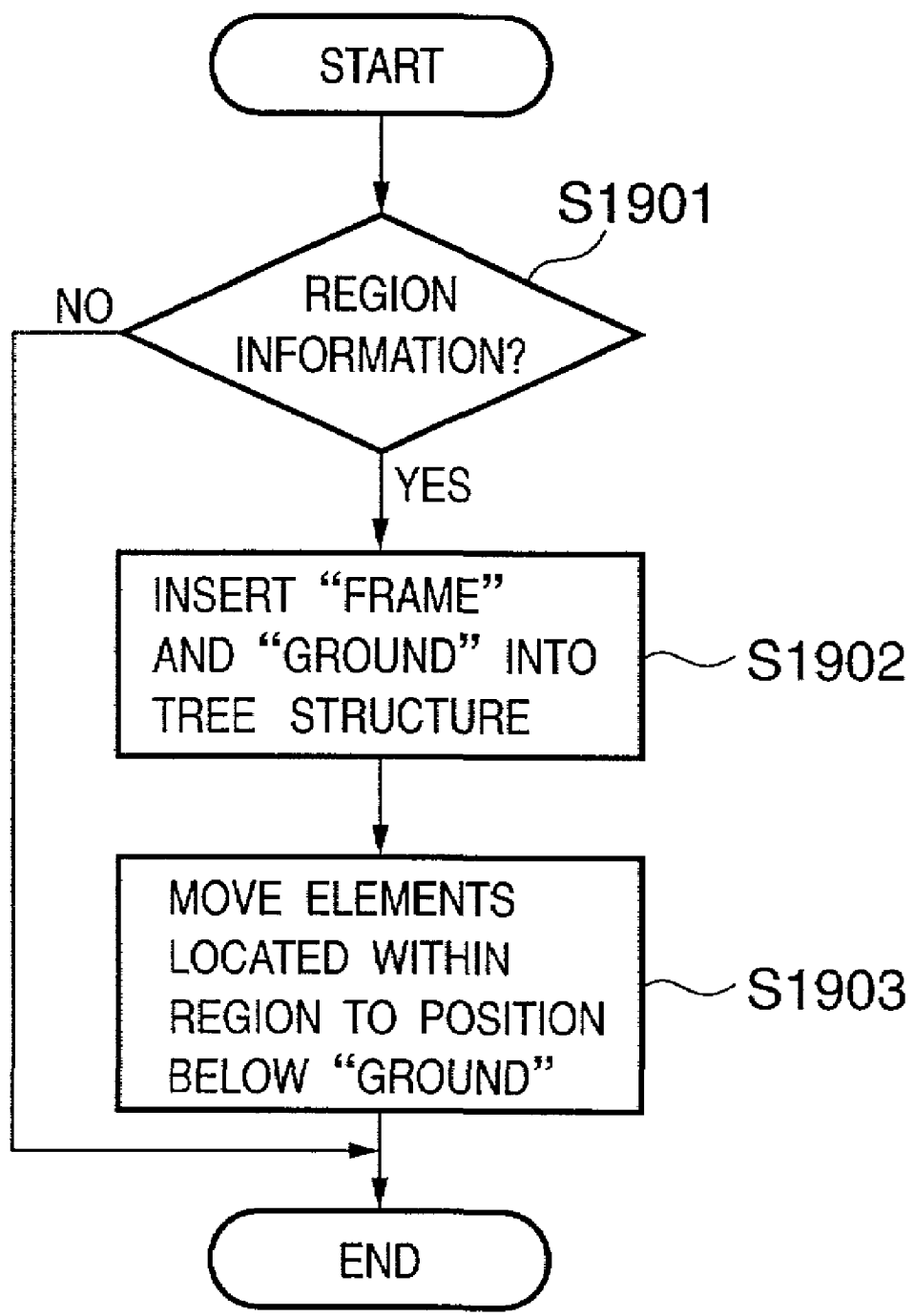
FIG. 19 is a flow chart for explaining the tree structure change process in step S1202 in FIG. 12.

After the tree structure of the document image elements is obtained in step S1201 in FIG. 12, the region information acquired in step S406 is applied to the tree structure in step S1202. That is, the tree structure obtained in step S1201 is changed with reference to the region information recorded in the binarization process of the binarization unit 302. The process in step S1202 will be described below using the flow chart in FIG. 19.

It is checked in step S1901 if region information is present. If no region information is available, this process ends. If region information is present, the flow advances to step S1902, and a region, which is temporarily considered as a set of "FRAME" and "GROUND", is inserted at an appropriate position of the tree structure of elements. That is, new "FRAME" corresponding to a rectangle represented by that region information is inserted at a position under "GROUND" as a parent that includes the region, and new "GROUND" is set as a child of inserted "FRAME".

In step S1903, elements, which are located inside the region of interest, as brothers having the same parent (GROUND) as "FRAME" inserted in step S1902 are moved to child positions of that region, i.e., those of new "GROUND".

Figure 20:
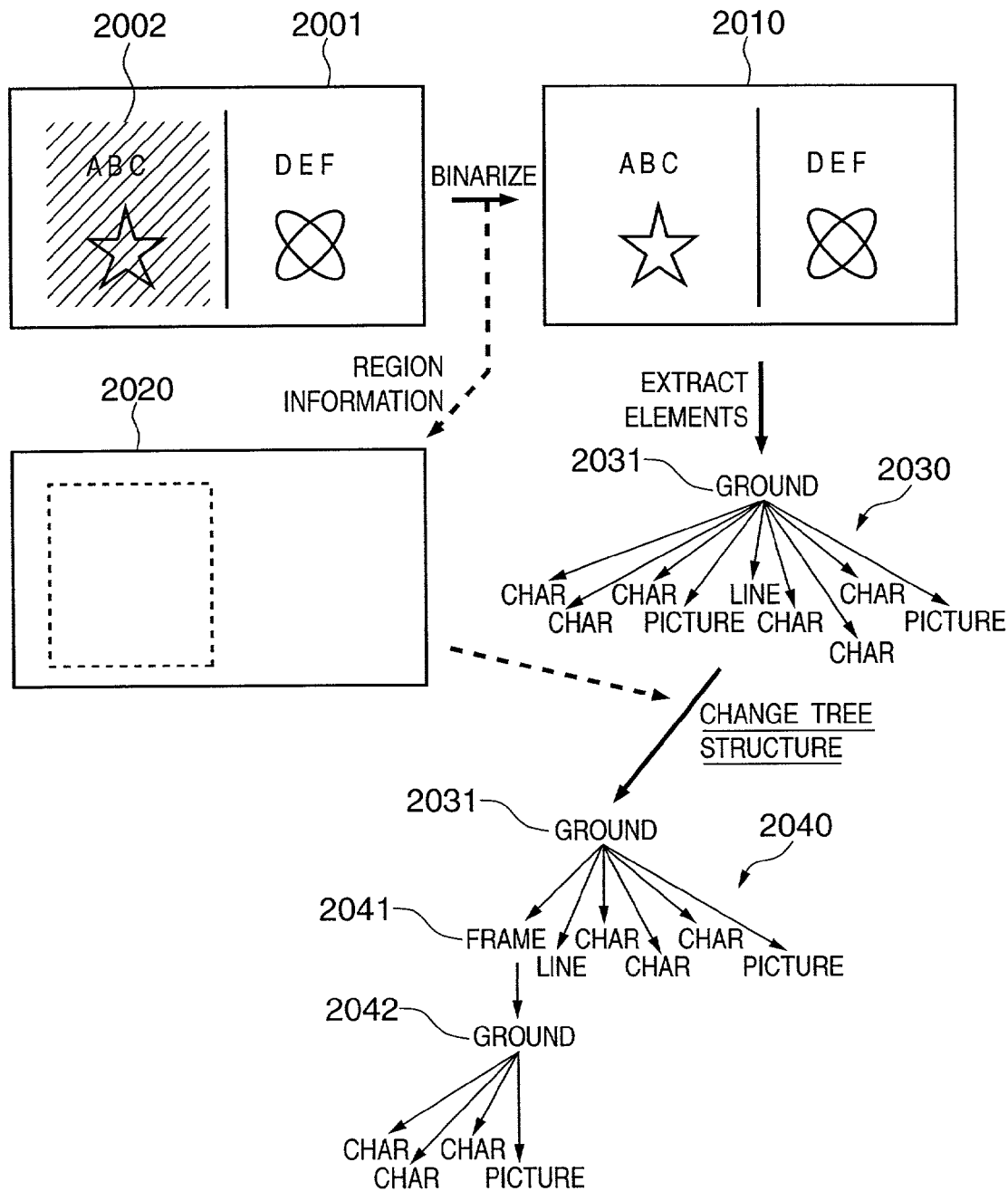
FIG. 20 is a view for explaining an example of the aforementioned tree structure change process.

FIG. 20 is a view for explaining an example of the aforementioned tree structure change process. A document image 2001 has a colored background region 2002. The binarization unit 302 binarizes this document image 2001 to generate a binary image 2010, and also generate region information 2020 corresponding to the region 2002 having a different background color (see the process in FIG. 4). The region segmentation unit 303 executes the process described using the flow chart of FIG. 13 for the binary image 2010 to generate a tree structure 2030 having the entire image as GROUND 2031 (S1201). Region information 2020 is applied to the tree structure 2030 to change that tree structure, thus obtaining a tree structure 2040.

More specifically, a frame (FRAME) 2041 corresponding to the region 2002 is inserted to have GROUND 2031 as a parent, and GROUND 2042 is set as a child of FRAME 2041. Elements (A, B, C, figure) included in the region 2002 are set as children of GROUND 2042, thus changing the tree structure.

Figure 21:
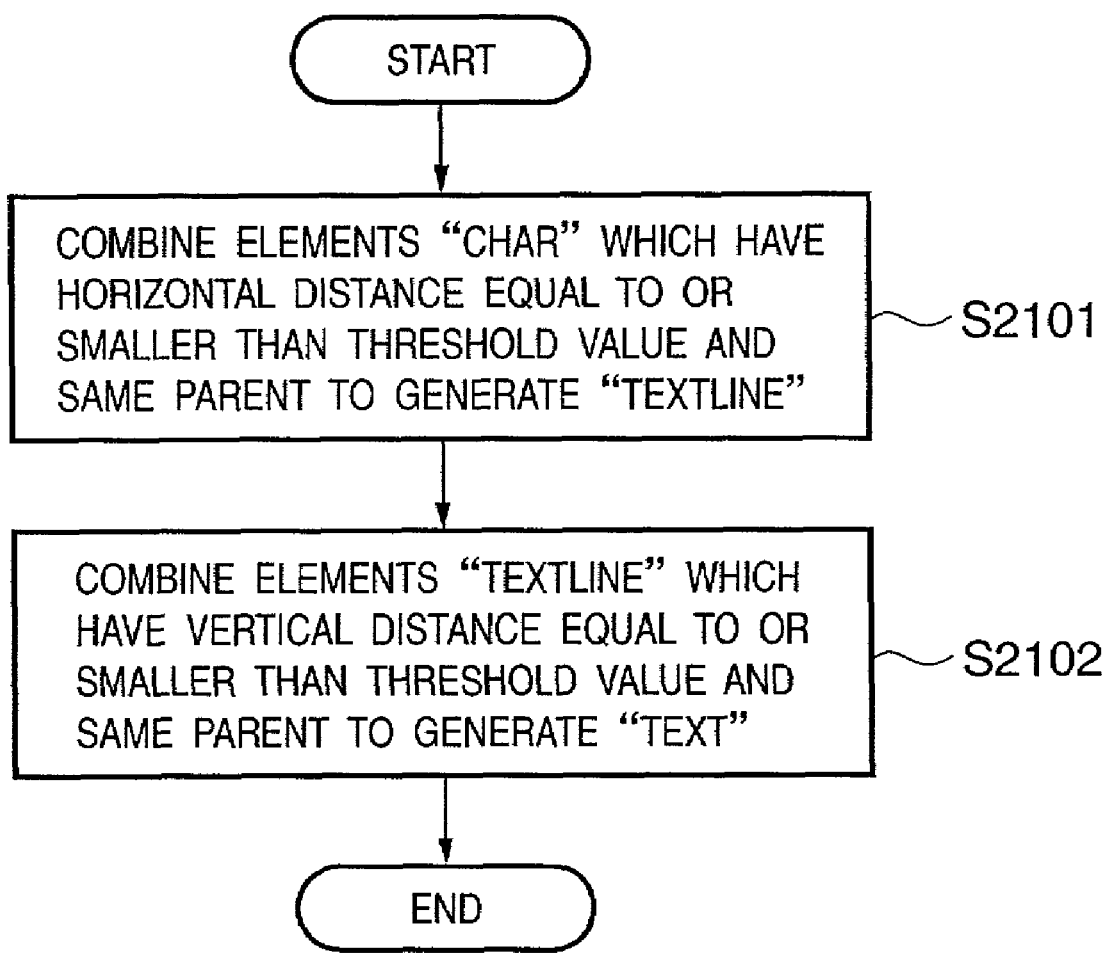
FIG. 21 is a flow chart for explaining a text region generation process in step S1203.

In this way, upon completion of the process in step S1202, the flow advances to step S1203. In step S1203, character elements are grouped to form a line and text region. The process in step S1203 will be described below using the flow chart in FIG. 21. FIG. 21 is a flow chart for explaining the text region generation process in step S1203.

In step S2101, neighboring elements "CHAR" having a horizontal distance, which is equal to or smaller than a threshold value, are grouped. This group is called "TEXT-LINE". Such grouping is done among elements "CHAR" having the same parent.

In step S2102, neighboring elements "TEXTLINE" having a vertical distance, which is equal to or smaller than a threshold value, are grouped. The obtained "TEXTLINE" group is called "TEXT" or a text region. Note that such grouping is done among elements "TEXTLINE" including elements "CHAR" having the same parent.

With the aforementioned processes, the document image is segmented into elements such as "TEXT" as a text region, "LINE" as a line image portion, "PICTURE" as a figure or photo region, and "FRAME" as a table or frame region.

Note that grouping upon generating a text region in step S2103 is done in consideration of the tree structure. Hence, as shown in, e.g., FIG. 22, if a solid line frame="FRAME1" is present on a binary image, characters inside and outside "FRAME1" form different groups. That is, characters inside and outside "FRAME1" are grouped into different text regions "TEXT1" and "TEXT3", and "TEXT2" and "TEXT4".

Figure 22:
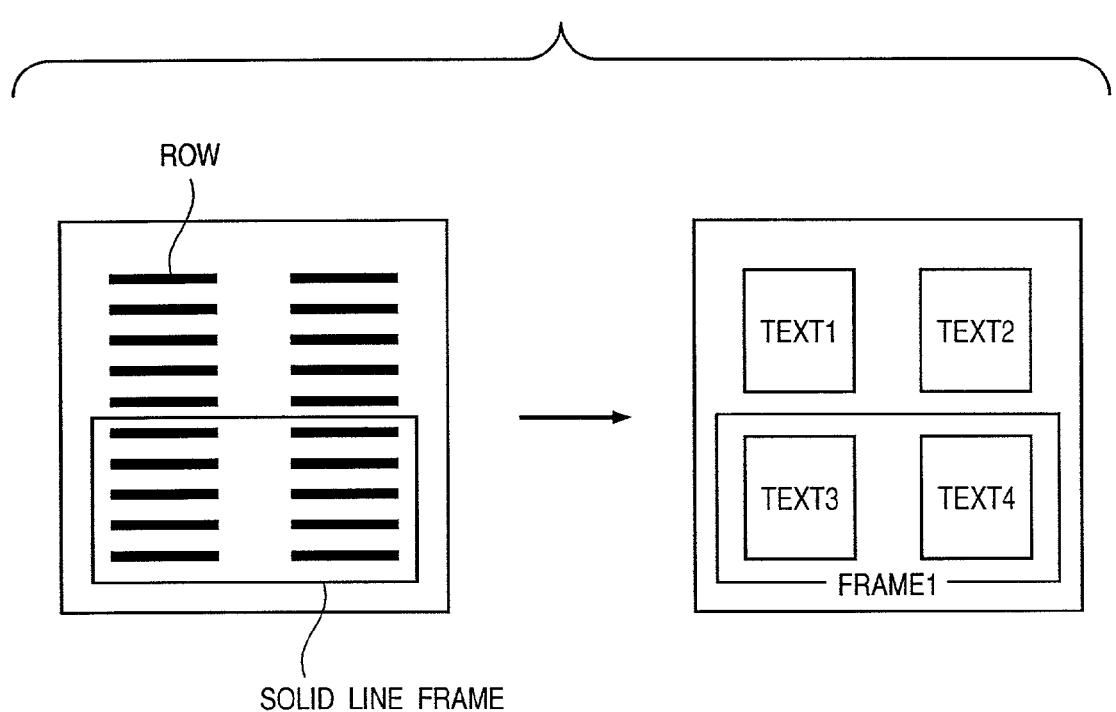
FIG. 22 shows an example of the region segmentation process of a document with a frame region.
Figure 23:
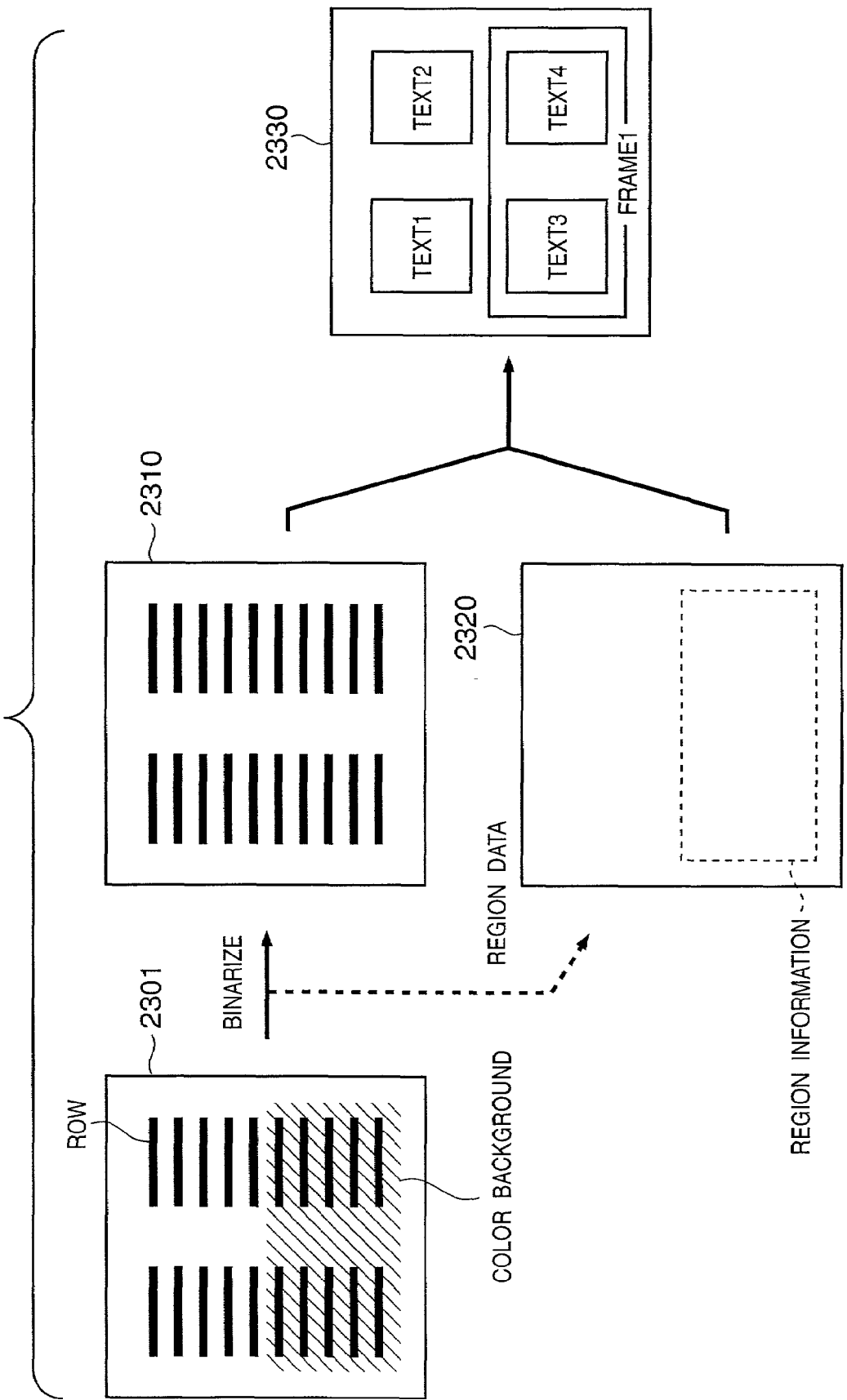
FIG. 23 shows correct region segmentation processes of a color document with a colored background region by the embodiment of the present invention.

Likewise, upon processing a color image shown in FIG. 23, even when no information indicating a frame is available on an image after the binarization process, region information obtained in the binarization process is reflected in region segmentation by the process in step S1202, and characters on a color background form a text region different from other characters, thus obtaining a correct region segmentation result as in FIG. 22. That is, the binarization unit 302 obtains a binary image 2310 of a document image 2301, and region information 2320. Upon segmenting the binary image 2310 into regions, the region information 2320 is reflected by the process in step S1202, thus obtaining a region segmentation result 2330.

Figure 24:
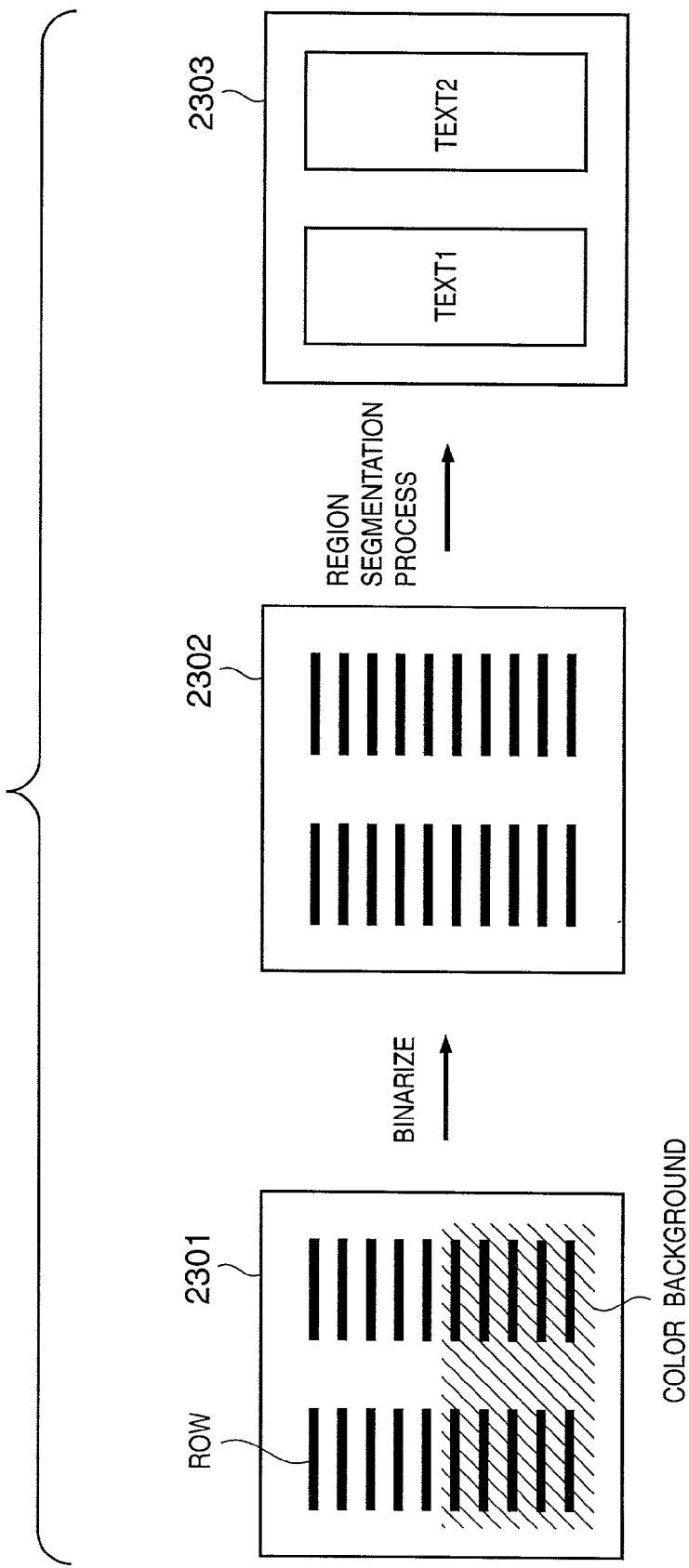
FIG. 24 shows region segmentation processes of a color document with a colored background region by a conventional method.

If a region segmentation process is done without executing step S1202, since background information is never reflected, wrong text regions are obtained, as shown in FIG. 24.

As described above, according to this embodiment, upon executing a region segmentation process of a binary image obtained by binarizing a color image, since the analysis contents of the region segmentation process are changed using region information of a colored background stored in the binarization process, text regions that can correctly reflect information that has been lost upon binarization can be extracted upon segmenting a color image, thus realizing a region segmentation process with higher precision.

In the above embodiment, region information saved in the binarization unit 302, and a "FRAME" region to be processed by the region segmentation unit 303 are limited to rectangles. A region defined by arbitrarily connected rectangles, a circle, ellipse, and the like may be used as an object to be processed. Even in this case, text regions that can correctly reflect information that has been lost upon binarization can be extracted, and a region segmentation process with higher precision can be realized.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

To restate, according to the present invention, region segmentation that can maintain region differences expressed by colors can be implemented.

As many apparently widely different embodiments of the present invention can be made without departing from the spirit and scope thereof, it is to be understood that the invention is not limited to the specific embodiments thereof except as defined in the claims.

What is claimed is:

1. A document processing apparatus comprising:
   determining means for determining a plurality of threshold values on the basis of a luminance distribution of a color image;
   binarization means for obtaining a plurality of binary image data by binarizing the color image based on each of the plurality of threshold values determined by said determining means;
   extracting means for extracting region information based on components included in the plurality of binary image data, the region information indicating a position and a size of regions having different background colors;
   generation means for generating second binary image data based on the plurality of binary image data and the region information by executing binarization processes in each of the regions associated with the region information extracted by said extracting means, wherein said generation means comprises means for determining each binarization threshold value for each partial region of the color image corresponding to each of the regions associated with the region information extracted by said extracting means; and wherein the second binary image data is generated by binarizing each of the partial regions using the set determined threshold value; and
   segmentation processing means for performing region segmentation based on the second binary image data generated by said generation means and the region information extracted by said extracting means.

2. The apparatus according to claim 1, wherein said generation means further comprises:
   means for determining if black and white levels of the partial region of the color image corresponding to each of the regions associated with the region information extracted by said extracting means are to be inverted; and
   means for inverting the black and white levels if it is determined that the black and white levels of the partial regions are to be inverted.

3. A document processing apparatus comprising:
   determination means for determining a plurality of threshold values based on a luminance distribution of a color image;
   binarization means for obtaining a plurality of binary image data by binarizing the color image based on each of the plurality of threshold values determined by said determination means;
   extraction means for extracting region information based on components included in the plurality of binary image data, the region information indicating a position and a size of regions having different background colors;
   generation means for generating second binary image data based on the plurality of binary image data and the region information;
   segmentation processing means for performing region segmentation based on the second binary image data generated by said generation means and the region information extracted by said extraction means;
   forming means for forming a tree structure by extracting document elements from the second binary image data generated by said generation means; and
   changing means for changing the tree structure by forming a partial tree structure, which has the document elements included in a region indicated by the region information to be children connected to a parent indicating that region,
   wherein said segmentation processing means performs the region segmentation based on the tree structure obtained by said forming means and said changing means.

4. A document processing method comprising:
   a determination step of determining a plurality of threshold values based on a luminance distribution of a color image;
   a binarization step of obtaining a plurality of binary image data by binarizing the color image based on each of the plurality of threshold values determined in said determination step;
   an extraction step of extracting region information based on components included in the plurality of binary image data, the region information indicating a position and a size of regions having different background colors;
   a generation step of generating second binary image data based on the plurality of binary image data and the region information, by executing binarization processes in each of the regions associated with the region information extracted in the extraction step, and wherein the generation step comprises determining a binarization threshold value for a partial region of the color image corresponding to each of the regions associated with the region information extracted in the extraction step; and wherein the second binary image data is generated by binarization of the partial regions using the set determined threshold value; and a segmentation processing step of performing region segmentation based on the second binary image data generated in said generation step and the region information extracted in said extraction step.

5. The method according to claim 4, wherein the generation step further comprises:

determining if black and white levels of the partial region of the color image corresponding to each of the regions associated with the regions information extracted in the extraction step are to be inverted; and inverting the black and white levels if it is determined that the black and white levels of the partial regions are to be inverted.

6. A document processing method comprising:

a determination step of determining a plurality of threshold values based on a luminance distribution of a color image:

a binarization step of obtaining a plurality of binary image data by binarizing the color image based on each of the plurality of threshold values determined in said determination step;

an extraction step of extracting region information based on components included in the plurality of binary image data, the region information indicating a position and a size of regions having different background colors;

a generation step of generating a second binary image data based on the plurality of binary image data and the region information;

a segmentation processing step of performing region segmentation based on the second binary image data generated in said generation step and the region information extracted in said extraction step;

a forming step of forming a tree structure by extracting document elements from the second binary image data generated in the generation step; and a changing step of changing the tree structure by forming a partial tree structure, which has the document elements included in a region indicated by the region information to be children connected to a parent indicating that region, wherein the segmentation processing step includes performing the region segmentation based on the tree structure obtained in the forming step and the changing step.

7. A computer readable medium storing a control program for making a computer execute a document processing method, said document method comprising:

a determination step of determining a plurality of threshold values based on a luminance distribution of a color image;

a binarization step of obtaining a plurality of binary image data by binarizing the color image based on each of the plurality of threshold values determined in said determination step;

an extraction step of extracting region information based on components included in the plurality of binary image data, the region information indicating a position and a size of regions having different background colors;

a generation step of generating second binary image data based on the plurality of binary image data and the region information, by executing binarization processes in each of the regions associated with the region information extracted in the extraction step, and wherein the generation step comprises determining a binarization threshold value for a partial region of the color image corresponding to each of the regions associated with the region information extracted in the extraction step, and wherein the second binary image data is generated by binarization of the partial regions using the determined threshold value; and a segmentation processing step of performing region segmentation based on the second binary image data generated in said generation step and the region information extracted in said extraction step.

* * * * *

UNITED STATES PATENT AND TRADEMARK OFFICE
CERTIFICATE OF CORRECTION

| | | |
|---|---|---|
| PATENT NO. | : 7,170,647 B2 | Page 1 of 1 |
| APPLICATION NO. | : 10/013675 | |
| DATED | : January 30, 2007 | |
| INVENTOR(S) | : Tomotoshi Kanatsu | |

It is certified that error appears in the above-identified patent and that said Letters Patent is hereby corrected as shown below:

<u>SHEET 3</u>

Fig. 3, "BINARIZATIO" should read --BINARIZATION--.

<u>COLUMN 6</u>

Line 65, "σip(i) is" should read --Σip(i) is--.

<u>COLUMN 7</u>

Line 25, "value 11" should read --value l1--.
    Line 32, "value 12" should read --value l2--.

<u>COLUMN 11</u>

Line 66, "set" should be deleted.
    Line 67, "value," should read --values,--.

<u>COLUMN 13</u>

Line 4, "set" should be deleted; and "value;" should read --values;--.
    Line 21, "image:" should read --image;--.

<u>COLUMN 14</u>

Line 35, "value;" should read --values;--.

<div style="text-align:center">

Signed and Sealed this

Twenty-fourth Day of July, 2007

JON W. DUDAS
*Director of the United States Patent and Trademark Office*

</div>